United States Patent
Khojastepour et al.

(10) Patent No.: US 8,472,554 B2
(45) Date of Patent: Jun. 25, 2013

(54) SIGNALING OF MIXTURE COMBINATION SETS

(75) Inventors: Mohammad A. Khojastepour, North Brunswick, NJ (US); Narayan Prasad, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 151 days.

(21) Appl. No.: 13/088,928

(22) Filed: Apr. 18, 2011

(65) Prior Publication Data

US 2011/0255632 A1 Oct. 20, 2011

Related U.S. Application Data

(60) Provisional application No. 61/325,035, filed on Apr. 16, 2010, provisional application No. 61/411,510, filed on Nov. 9, 2010.

(51) Int. Cl.
*H04L 27/00* (2006.01)

(52) U.S. Cl.
USPC .......................................... 375/295; 375/260

(58) Field of Classification Search
USPC .................................................. 375/295, 260
See application file for complete search history.

(56) References Cited

U.S. PATENT DOCUMENTS

| | | | | |
|---|---|---|---|---|
| 2011/0032839 | A1* | 2/2011 | Chen et al. | 370/252 |
| 2011/0069772 | A1* | 3/2011 | Vrzic et al. | 375/261 |

OTHER PUBLICATIONS

Huawei, et al. "Simulation Assumption on Rel. 10 Feedback for 4 TX" 3GPP TSG RAN WG1 61, R1-103338. May 2010. (9 Pages) Retrievable from: http://ftp.3gpp.orgs/specs/html-info/TDocExMtg--R1-61b--28159.htm.

Jindal, N. "Antenna Combining for the MIMO Downlink Channel". IEEE Transactions on Wireless Communications. vol. 7, No. 10. Oct. 2008. pp. 3834-3844.

NEC Group, "Results for MU-MIMO Under 4 TX Evaluation Assumptions" 3GPP TSG RAN WG1 R1-103831 61bis. Jun. 2010. (8 Pages) Retrievable from: http://ftp.3gpp.orgs/specs/html-info/TDocExMtg--R1-61b--28159.htm.

NTT DOCOMO, "Investigation on Enhanced DL MU-MIMO Processing Based on Channel Vector Quantization for LTE-Advanced" 3GPP TSG RAN W1 Meeting No. 58, R1-093511. Aug. 2009. pp. 1-8. Retrievable from: http://www.kusume.com/publication.

Ravindran, N., et al. "Limited Feedback-Based Block Diagonlization for the MIMO Broadcast Channel". IEEE Journal on Selected Areas in Communications. vol. 26, No. 8. Oct. 2008. pp. 1473-1482.

Trivellato, M., et al. "On Transceiver Design and Channel Quantization for Downlink Multiuser MIMO Systems With Limited Feedback". IEEE Journal on Selected Areas in Communications. vol. 26, No. 8. Oct. 2008. pp. 1494-1504.

(Continued)

*Primary Examiner* — Shuwang Liu
*Assistant Examiner* — Michael Neff
(74) *Attorney, Agent, or Firm* — Joseph Kolodka; James Bitetto

(57) ABSTRACT

Systems and methods for conveying and determining modulations schemes employed by co-scheduled users are disclosed. In addition, methods and systems for designing signaling schemes that convey such information are also disclosed. In accordance with one method, an index is received and a table of indices in which the received index denotes a plurality of different sets of modulation schemes is referenced. Further, one or more modulation schemes of at least one co-scheduled user is determined based on the referencing. In addition, data signals are received and are processed by utilizing the one or more modulation schemes.

18 Claims, 6 Drawing Sheets

OTHER PUBLICATIONS

Yoo, T., et al. "Multi-Antenna Downlink Channels With Limited Feedback and User Selection". IEEE Journal on Selected Areas in Communications. vol. 25, No. 7. Sep. 2007. pp. 1478-1491.

U.S. Appl. No. 12/642,047 First Named Inventor: Narayan Prasad Entitled: "Methods and Systems for Conveying Scheduling Information of Overlapping Co-Scheduled Users in an OFDMA-MU-MIMO System," filed Dec. 18, 2009.

U.S. Appl. No. 12/642,126 First Named Inventor: Narayan Prasad Entitled: "MU-MIMO-OFDMA Systems and Methods for Servicing Overlapping Co-Scheduled Users," filed Dec. 18, 2009.

U.S. Appl. No. 13/080,374 First Named Inventor: Narayan Prasad Entitled: "MU-MIMO-OFDMA Systems and Methods for Multi-Rank CQI Computation and Precoder Selection," filed Apr. 5, 2011.

U.S. Appl. No. 13/080,416 First Named Inventor: Narayan Prasad Entitled: "MU-MIMO-OFDMA Multi-Rank CQI and Precoder Signaling Schemes," filed Apr. 5, 2011.

U.S. Appl. No. 13/080,403 First Named Inventor: Narayan Prasad Entitled: "MU-MIMO-OFDMA Methods and Systems for Signaling Multi-Rank CQIs and Precoders," filed Apr. 5, 2011.

* cited by examiner

SIGNALING OF MIXTURE COMBINATION SETS

RELATED APPLICATION INFORMATION

This application claims priority to provisional application Ser. No. 61/325,035 filed on Apr. 16, 2010 and provisional application Ser. No. 61/411,510 filed on Nov. 9, 2010, each of which is incorporated herein by reference.

This application is related to commonly owned application Ser. No. 13/088,955, entitled 'SELECTIVE JOINT DEMODULATION'), which is filed concurrently herewith and is incorporated herein by reference.

BACKGROUND

1. Technical Field

The present invention relates to communication systems in which transmitted signals are subject to interference and, more particularly, to systems, methods and apparatuses for signaling and receiving scheduling parameters in such systems.

2. Description of the Related Art

In many practical systems with multiple terminals and a central control entity, it can be advantageous to communicate or signal information about a set of terminals to each individual terminal in this set or in one of its subsets. Examples in which the conveyance of such information can be beneficial is downlink wireless communication systems, where a base station and multiple users or terminals can communicate simultaneously. In such cases, the central entity, for example, the base station, may signal the modulation information of some or all of the co-scheduled users in the MU-MIMO (Multi-User Multiple Input, Multiple Output) scenario, to each scheduled user. Such modulation information can be employed in joint demodulation of data signals to reduce decoding errors.

SUMMARY

One embodiment is directed to a method for determining modulation information of co-scheduled users. In accordance with the method, an index is received and a table of indices in which the received index denotes a plurality of different sets of modulation schemes is referenced. Further, one or more modulation schemes of at least one co-scheduled user is determined based on the referencing. In addition, data signals are received and are processed by utilizing the one or more modulation schemes.

An alternative embodiment is directed to a system for conveying modulation information of co-scheduled users. The system includes a scheduler that is configured to determine a set of co-scheduled users, a respective total number of streams for each of the users and a respective modulation scheme for each of the users. The system further includes a controller that is configured to reference a listing of sets of modulation schemes to determine a set of modulation schemes that conforms to the determined total numbers of streams for each of the users and conforms to the determined modulation schemes for each of the users. The controller is further configured to reference a table of indices in which each index of a plurality of the indices denotes a respective plurality of different sets of modulation schemes in the listing to select indices from the table for transmission to the co-scheduled users that denote the determined set of modulation schemes. In addition, the system includes a transmitter that is configured to transmit a different one of the selected indices to each of the respective users to permit each of the users to determine the modulation schemes assigned to at least one other co-scheduled user.

Another embodiment is directed to a computer readable storage medium comprising a computer readable program. The computer readable program when executed on a computer causes the computer to perform a method for designing a signaling table to convey modulation information of co-scheduled users. The method includes determining possible combinations of modulation schemes for a total number of users based upon splits, wherein a split is a sequence of total numbers of streams respectively allocated to co-scheduled users that is arranged in decreasing order. The method further includes allocating indices to the determined combinations to generate the signaling table for use in conveying to a given user modulation schemes employed by users that are co-scheduled with the given user.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
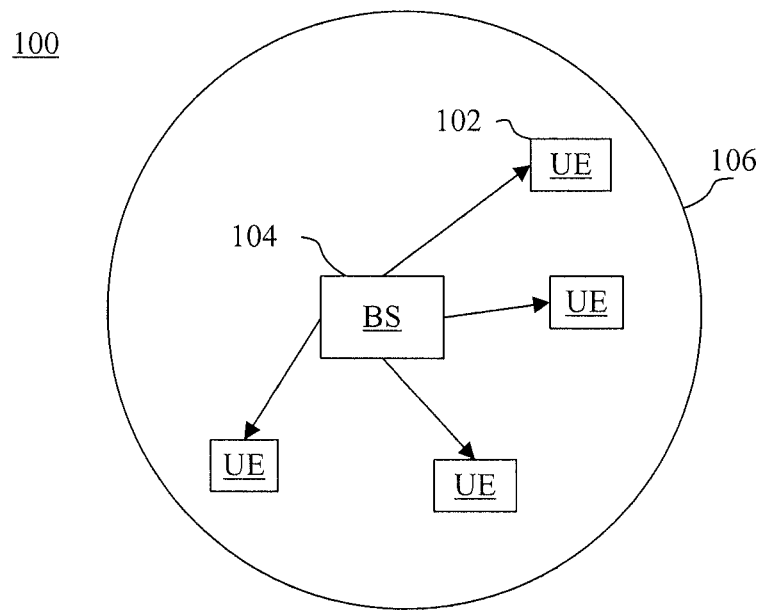
FIG. 1 is a high-level block diagram of a communication system embodiment.

As indicated above the base station, may signal the modulation information of some or all of the co-scheduled users in the MU-MIMO scenario to each co-scheduled user. Co-scheduled users comprise, for example, receivers or users that are assigned at least one resource block (RB) that overlaps with at least one RB assigned to one or more other users. In turn, co-scheduled streams comprise, for example, streams that are transmitted on at least one common resource block (RB). The modulation information could be provided for all possible assignment of modulations to the participating terminals in a MU-MIMO session, or it could be conveyed only for a subset of possible modulation assignments. As also indicated above, the conveyance of modulation information can provide the system with several benefits that can aid in reducing decoding errors. For example, knowledge of the modulation of other co-scheduled users permits the user to employ sophisticated modulation-aware demodulators, which generate more reliable log-likelihood ratios (LLRs) for its codewords and hence reduce its error probability. In addition, if the user is informed of the coding rates of some or all of the other co-scheduled users, the user can decode codewords of co-scheduled users to perform interference cancellation.

Exemplary implementations of the present invention enable an efficient conveyance of the modulation information of co-scheduled users. For example, a procedure for designing a simple and close to optimal signaling scheme for conveying this information that reduces the feedback load is described. Several advantageous properties of certain communication systems have been identified and considered to design an efficient signaling method. For example, one important aspect is the recognition of equivalences between permutations of the type (or modulation) information of users with the same degree (or number of streams). For example, as described in more detail herein below, this observation enables the storage of only one possibility for all different assignments of a number of different types of modulations. For example, if there are four different types of modulations, only one possibility can be considered and stored, although the total number of permutations are 4!=24 possibilities.

Another aspect is the concept of a "split" and an ordering relation within elements of the split. As described below, the signaling scheme can be based on this ordering relation. In accordance with another aspect, the modulation information of the user stream that is usually available from other sources or signaling can be employed to aid in determining the modulation information of other users. This aspect also permits for a considerable reduction in the size of feedback signals.

In accordance with other embodiments, a selective joint demodulation scheme can be employed in cases in which the base station schedules a set of users but only transmits data streams to a subset of the users. Here, each user is aware of the entire set of (near) orthogonal dimensions in the time-frequency-spreading-code space that are reserved for pilot signals corresponding to the streams expected to be transmitted and determines which of the streams expected to be transmitted are missing based on powers or norms of pilot signals that are transmitted on the (near) orthogonal dimensions. Further, each user can select a subset of streams that are present in the transmissions from the base station to perform joint demodulation on received data signals, while suppressing non-selected streams.

Referring now in detail to the figures in which like numerals represent the same or similar elements and initially to FIG. 1, an OFDMA (Orthogonal Frequency-Division Multiple Access) based MU-MIMO system 100 in which embodiments of the present invention may be implemented is illustrated. In the downlink of system 100, multiple scheduled users (UEs) 102 in a cell 106 are simultaneously served by a base station (BS) 104 on an available set of resource blocks (RBs), where each RB is a particular set of contiguous subcarriers and consecutive OFDM symbols. As described in detail herein below, in accordance with the present principles, the base station 104 and the users 102 can employ a variety of signaling schemes that efficiently convey modulation information of other co-scheduled users.

For example, a scenario in which there are M types of modulations, S total number of transmitted streams and K users 102, where each user will be allocated at least one and at most L streams, is considered. In most practical scenarios, it can be assumed that all the streams allocated to a particular user have the same modulation type. With a naive way of counting, there would be total of $M^S$ possibilities and the number of bits used to signal all the possibilities to any user would be $\log_2(M^S)$. In addition, the position of the streams allocated to that user should also be signaled.

In accordance with aspects of the present principles, each possible assignment of streams and modulation types to the K users, where all streams assigned to a particular user are associated with the same modulation, is defined as a mixture combination set. For example, assume that there are K=3 users (each with one stream) and that there are M=3 modulation types A, B, and C. The modulation types A, B, and C, can indicate, for example, QPSK (quadrature phase-shift keying) modulation, 16-QAM (quadrature amplitude modulation) and 64-QAM. A possible miXture Combination Set (XCS) can be denoted by (A,1,1).(B,2,2).(C,3,3) where (A,1,1), (B,2,2), and (C,3,3) are the modulation type, stream index and user index 3-tuples for the first, second, and third user, respectively. Embodiments for designing and utilizing efficient signaling methods that can convey these mixture combination sets are described.

In particular, one or more of the following insights can be employed in the signaling schemes. Firstly, a permutation of the stream assignment would not affect the system performance, as each stream permits for an (almost) identical quality of channel estimation. Secondly, if their own modulation information is known from other sources, then the users can take advantage of this knowledge to deduce the stream indices and/or modulations of other co-scheduled users from a condensed signaling from the base station. Thirdly, it could be beneficial to reserve a subset of signals for conveying only the user stream indices without any further modulation information.

Preliminarily, the source (e.g., the base station) assigns the streams to the different users as well as the user indices, which together decide at a particular instance who is the $k^{th}$, k=1, . . . , K, user and which set of streams belongs to the user. It is noted that permuting the user stream assignment, while holding the number of streams, the type of modulation and the precoding vector (or matrix) assigned to each user fixed, would not affect either the system or the per-user performance. Therefore, by using this property, it is not required to consider possible XCS that are stream-permutations of each other. For example, consider two possible XCSs (A,1,1).(B,2,2).(B,3,2).(C,4,3).(A,5,4) and (B,1,2).(B,2,2).(A,3,1).(A,4,4).(C,5,3) to K=4 users. From a system and per-user performance perspective, these two XCSs are equivalent. Moreover, because the users can be re-indexed by the base station at any time, these two XCSs are also equivalent to (B,1,1).(B,2,1).(A,3,2).(A,4,3).(C,5,4), where the understanding is that the first user has been re-indexed as 2, the second user has been re-indexed as 1, the third user has been re-indexed as 4 and the fourth user has been re-indexed as 3. This key property results in the following simplifications.

First, the invariance with respect to a "split" is considered. One of the simplifications is that, in exemplary embodiments, the design may only consider "splits." In particular, a split is denoted by $\{S_1, S_2, \ldots, S_K\}$, where $S_i$ is the number of streams assigned to the user with index i. It is assumed that stream indices $1, \ldots, S_1$ are assigned to the user with index 1, stream indices $S_1+1, \ldots, S_1+S_2$ are assigned to the user with index 2 (for $S_2 > 1$) and so on. Moreover, the weight of a user in a split is defined as the number of streams allocated to this user in that split. An ordering on the split is further imposed in that $S_1 \geq S_2 \ldots \geq S_K$.

Second, the invariance with respect to permutations of modulations is considered. The other simplification is that the permutation of the modulations within any subset of a split having equal weight elements would also result in no change in performance, as long as the user-modulation association is unchanged.

To implement these simplifications, consider a split $\{S_1, S_2, \ldots, S_K\}$. Here, $$\sum_{k=1}^{K} S_k = S.$$

For example, the mixture combination string (B,1,1).(B,2,1).(A,3,2).(A,4,3).(C,5,4) corresponds to the split $\{2,1,1,1\}$. All XCSs of the form (B,π(1),ψ(1)).(B,π(2),ψ(1)).(A,π(3),ψ(2)).(A,π(4),ψ(3)).(C,π(5),ψ(4)), where π(•) is any permutation of $\{1,2,3,4,5\}$ and ψ(•) is any permutation of $\{1,2,3,4\}$, are equivalent in the sense that any two such XCSs differ in user and/or stream indexing, but, across all such XCSs, each user is assigned the same modulation and the same number of streams, albeit with possibly a different user index and/or a different stream index (indices). It is sufficient to pick and convey one XCS from this class. Thus, (B.B).A.A.C can be specified as the representative of the class, with the understanding that streams 1 and 2 and modulation B are assigned to the user with index 1, stream 3 and modulation A are assigned to the user with index 2, stream 4 and modulation A are assigned to the user with index 3 and stream 5 and modulation C are assigned to the user with index 4. It is noted that the modulations within the parenthesis are assigned to the same user and, hence, are identical. In the sequel, to denote the splits, the notation $S_1$-$S_2$-$\ldots$-$S_K$ is used where the user weights are sorted in descending order with hyphens, e.g., 2-1-1-1.

Figure 2:
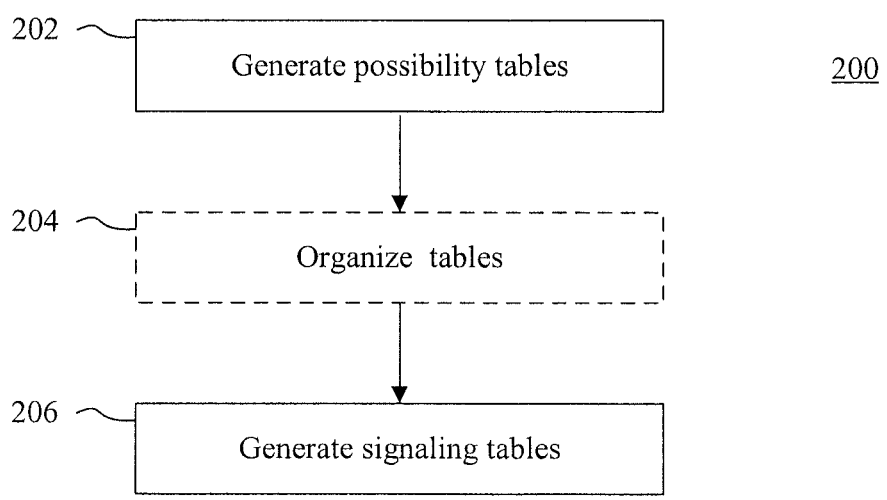
FIG. 2 is a high-level block/flow diagram of an embodiment of a method for designing a signaling scheme.

Using splits and the modulation permutation property, a variety of signaling designs can be made. With reference now to FIG. 2, a method 200 for designing a signaling scheme is illustrated. As described further herein below, the method can be performed by a hardware processor. The method steps can be implemented entirely in hardware. Alternatively, the method can be implemented in software that is stored on a storage medium to provide instructions to the hardware processor and thereby enable the processor to implement the method. In accordance with the method, a set of tables, referred to as possibility tables, are designed at step 202. Subsequently, at step 206, signaling tables in which the signaling is explicitly defined, can also be designed. Here, the signaling tables can be configured to make use of the possibility tables. The design of these two tables can depend on the use case scenario. In particular, the designs of the tables can depend on whether or not the self-modulation information for each user is known from a separate signal or if it is inferred from the designed tables. The designs of the tables can also vary with respect to whether all of the modulation information of co-scheduled users is conveyed to any given user or a part of the modulation information is conveyed to any given user.

The method 200 can begin at step 202, in which the processor can generate possibility tables. Based on the insight regarding the invariability with respect to stream index permutation, the number of cases that should be considered to signal the modulation information for a given total number of streams, S, can be reduced to $$\binom{S+M-1}{M-1}.$$

However, the signaling of the stream indices to each of the users should be separately considered.

For a given number of streams, S, all mixture combination sets that correspond to ways of distributing S identical objects into M bins can be considered. Each such way can be considered as a string of modulation types of length S. All these entries are placed into a table that is referred to as a possibility table, as noted above. Considering all possible total numbers of streams from 2 to S, the total number of entries of the possibility tables are $$\sum_{s=2}^{S} \binom{s+M-1}{M-1} \quad (1)$$

The collection of all the possibility tables for different choices of the total number of streams, S, can be used to perform signaling of the modulation information to all users. Although this aggregated table is sufficient to perform the signaling task, the approach is relatively inefficient. A more intelligent approach would have a successive structure for the tables so that some of the entries of the tables designed for a given split can be reused for other splits. It should be noted that any entry of the possibility table can be permuted based on the invariance property with respect to the modulation permutation. The goal of this permutation is to arrange the entries of the possibility table in such a way that the signaling can be reduced. The following procedure can be used to design the possibility table and can be employed to implement step 202 of the method 200.

For a given split $S_1$-$S_2$-$\ldots$-$S_K$, the weights can be grouped into several sections where each section consists of the users with the same weights. Suppose there are n sections of sizes $N_1, N_2, \ldots, N_n$. Accordingly, $S_i = S_j$ if there exists l, 1<l<n such that $$\sum_{t=1}^{l-1} N_t < i \le \sum_{t=1}^{l} N_t \text{ and } \sum_{t=1}^{l-1} N_t < j \le \sum_{t=1}^{l} N_t$$

and vice versa (define $N_0 = 0$). For each section separately, combinations of types with repetition can be determined and then all the determined streams can be combined together. For example, consider two modulation types A and B and the split 2-2-1-1. Here, users with equal weights are formed into two sections, denoted as 2-2 and 1-1. All combinations with repetitions can be determined as follows for the section denoted by 2-2: AAAA, AABB and BBBB. For the other section 1-1, we also have AA, AB, BB. Thus, the table for this split would consist of AAAAAA, AAAAAB, AAAABB, AABBAA, AABBAB, AABBBB, BBBBAA, BBBBAB, BBBBBB. Recall that the user weights in a split are sorted in descending order. It should be noted that the sectioning is employed to take advantage of the properties of the combinations or sets of modulation schemes. For example, each set or combination is permutable such that stream indices of modulations assigned to co-scheduled users having a common total number of allocated streams are swappable without affecting a total number of indices of a signaling table, described in more detail herein below, and without affecting a total number of modulation scheme combinations conveyable by the table.

In accordance with one implementation, to improve the efficiency of the design, a successive approach can be adopted. For example, with reference to FIG. 3, with continuing reference to FIG. 2, a method 300 for designing one or more possibility tables in accordance with a successive design approach is illustrated. The method 300 can be performed to implement step 202 described above. It should be noted that any table described herein can alternatively be implemented as a listing.

The method 300 can begin at step 302, in which the processor determines and compiles all relevant splits for a given total number of streams. For example, assume that K=2, 3, 4; M=3 and S=4. Accordingly, the possible splits are as follows: 2-2, 2-1-1, and 1-1-1-1.

At step 304, the processor determines whether all splits are covered by the table. For example, the processor determines whether all possible combinations of modulations for all compiled splits are included in the possibility table. If not, the method can proceed to step 306.

At step 306, the processor can evaluate the next successive split and can group users of equal weights into separate sections, as described above, for the currently evaluated split. With regard to a "successive" split, in general, if S streams are considered and split, a split $S_1$-$S_2$-....-$S_K$ succeeds the split $T_1$-$T_2$-....-$T_J$ if it can be obtained by splitting some of the entries $T_k$ further. Conversely, in such a case, the split $T_1$-$T_2$-....-$T_J$ precedes the split $S_1$-$S_2$-....-$S_K$. For example, 2-1-1 succeeds 2-2 and also 1-1-1-1 succeeds both 2-1-1 and 2-2. In addition, a given split having a number of modulation schemes that is larger than a number of modulation schemes of another split succeeds the other split. In turn, a given split having a number of modulation schemes that is less than a number of modulation schemes of another split precedes the other split. In the successive design approach, the design for a split is performed after the design for all its proceeding splits has been performed. Thus, for a given total number streams, the procedure first focuses on the least possible number of users to perform the design. Accordingly, the "next successive split" here in the example for K=2, 3, 4; M=3 and S=4, the processor performs the design for the 2-2 split, which corresponds to 2 users. As indicated above, the processor can group the users of equal weights into separate sections, which in this case is a single section for the two users.

At step 308, the processor determines whether all sections in the current split have been evaluated. If not, the method proceeds to step 310, in which the processor determines all combinations or sets of modulation schemes with repetition for the next section. Accordingly, in the example provided above, for the section in the 2-2 split, the processor determines the combinations or sets as follows: AAAA, AABB, BBBB, BBCC, CCCC, CCAA. Thereafter, the method can proceed to step 308.

If, at step 308, the processor determines that all sections of the currently evaluated split have been considered, then the method can proceed to step 310 in which all combinations are combined and entered into the possibility table, as described above. Here, in the 2-2 split example, where there is only one section, the determined combinations are simply entered into the possibility table. Thereafter, the method can proceed to step 304.

If, at step 304, the processor determines that not all splits are covered by the table, then the method can proceed to step 306, as described above, in which the processor evaluates the next successive split and groups users of equal weights into separate sections. Continuing with the example for S=4, the next successive split is 2-1-1. Subsequently, the processor can perform steps 306-312, as described above, for the split 2-1-1 to obtain the following combinations for entry into the possibility table: AAAB, AABC, AACA, BBAB, BBBC, BBCA, CCAB, CCBC, CCCA.

Thereafter, the method proceeds to step 304 and the processor determines whether all splits are covered by the table. As noted above, the processor can examine the compiled splits and can determine whether all possible combinations of modulations for all compiled splits are included in the possibility table. For the example for S=4, the next successive split 1-1-1-1 need not be further evaluated, as all of its possibilities are already covered by the combinations previously determined for splits 2-2 and splits 2-1-1. The resulting efficiency in the design process is one advantage of evaluating the splits successively. After determining that the combinations of all of the compiled splits are covered, the processor can proceed to step 314, where it can output the possibility table. Thereafter, method 300 can be repeated for another total number of streams S. Examples of possibility tables, such as Tables 1-3, are described in more detail herein below.

After designing the possibility tables, the processor can design the signaling table. In accordance with one exemplary implementation, to send a signal to each user, the central control entity (e.g., the base station) can send a number between 1 to I to each user. This signal could be different for different users. The user, based on this signal, can decode at least the following information: (1) the total number of streams, (2) the indices of its own streams, (3) the (modulation) type associated with each stream (or a subset of the co-scheduled streams). It should be noted that the user is not required to infer the number of co-scheduled users or the indices of streams that are allocated to each co-scheduled user to obtain their modulation information. It should also be noted that the base station can convey the user's own modulation via I or the base station can convey the user's modulation using some other signal, in which case I does not need to include the information about the user's own modulation. Thus, the design of the tables can be performed with the assumption that the user already knows its modulation. Table 4, below, provides one example of a signaling table in which the user knows its modulation.

If the user does not know its own assigned (modulation) type and cannot find this information from any other source, the signals are designed as follows. The processor can consider every split and its corresponding possibility table and, for each split and table, can add associated signals to the signaling that indicate the modulation of a particular user. For every split $S_1$-$S_2$-....-$S_K$, the processor considers P signals for a table of size P entries, where each signal identifies one or more user indices k, $1 \leq k \leq K$ in the split $S_1$-$S_2$-....-$S_K$ and one of the P entries of the table for this split. The processor considers the splits in order and performs the addition for a split only if the addition for all its succeeding splits have been performed. Therefore, the selection of the splits in the signal selection step is in a different order than that in the possibility table design of method 300. For example, for K=2, 3, 4; M=3 and S=4, the processor can first perform the addition for the 1-1-1-1 split, then adds the corresponding signals for the 2-1-1 split and then adds the corresponding signals for the 2-2 split.

If the user can determine its own modulation type from some other source or signal, the signaling to the user could be much more compressed. For example, returning to the method 200, the processor can optionally organize the possibility tables at step 204. The processor orders the tables in such a manner that the difference between the number of instances of each modulation type in each column of the table is minimized and preferably the number of instances of each modulation type in a given column are equal (if possible). For example, in each of the columns of the possibility Table 3, below, each of the three modulation types A, B and C appear five times. This property is desirable for all the splits; therefore, the arrangement should also be in the same order of splits described above with regard to the method 300. In other words, the arrangement for a given split is located in the table after all the arrangements for its preceding splits. For example, in Table 3 below, entries 22-40 corresponding to the 2-1-1 split appear in the Table 3 after entries 16-21 corresponding to the 2-2 split.

After implementing the arrangement of the possibility tables, the signal for each split $S_1$-$S_2$-....-$S_K$ with a table of size P entries would be reduced to the sum over the user indices of the maximum number of times a modulation type is repeated in any column corresponding to that user index in the possibility table (for the given split). Let the maximum number be denoted by $P_k$ for the user index k. In other words, for each user index k, entries of the table can be grouped into at most $P_k$ sets, where the modulations corresponding to the user index k are different among all entries in a set. For example, Table 4, which uses the possibility Table 3, illustrates an example of this feature. Here, in Table 3, the maximum number of times a modulation type is repeated in any column corresponding to a user index in the possibility table for the split 1-1-1-1, which is covered by the entire table, is five. For example, as noted above, in each of the columns of the possibility Table 3, each of the three modulation types A, B and C appear five times. For any given index, such as index 0, entries of the possibility table for the split 1-1-1-1 can be grouped into at most $P_k$=5 sets such that the modulations corresponding to the user index are different among all entries in a set. As illustrated in entries 19-23 for the user index 0 in the signaling table (Table 4), entries from the possibility table (Table 3) can be grouped in the $P_k$=5 following sets, where the modulation for index zero is different in the entries of a set: {16,17,18}, {19,20,21}, {22,23,24}, {25,26,27}, {28,29,30}. Therefore, by knowing its own modulation, each user can easily find out the other modulation types by having an index to one of these sets.

Figure 3:
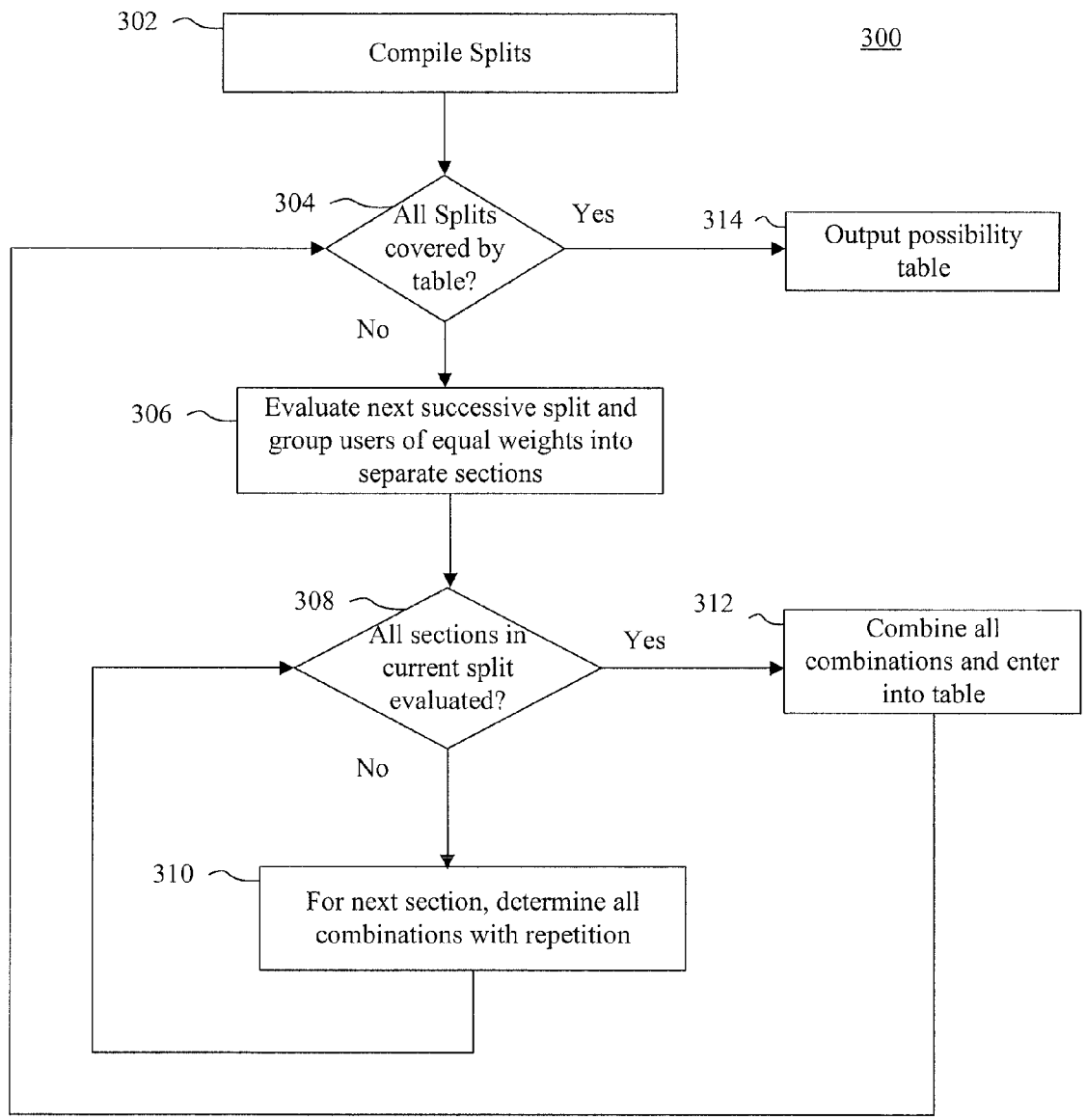
FIG. 3 is a high-level block/flow diagram of an embodiment of a method for designing possibility tables.
Figure 4:
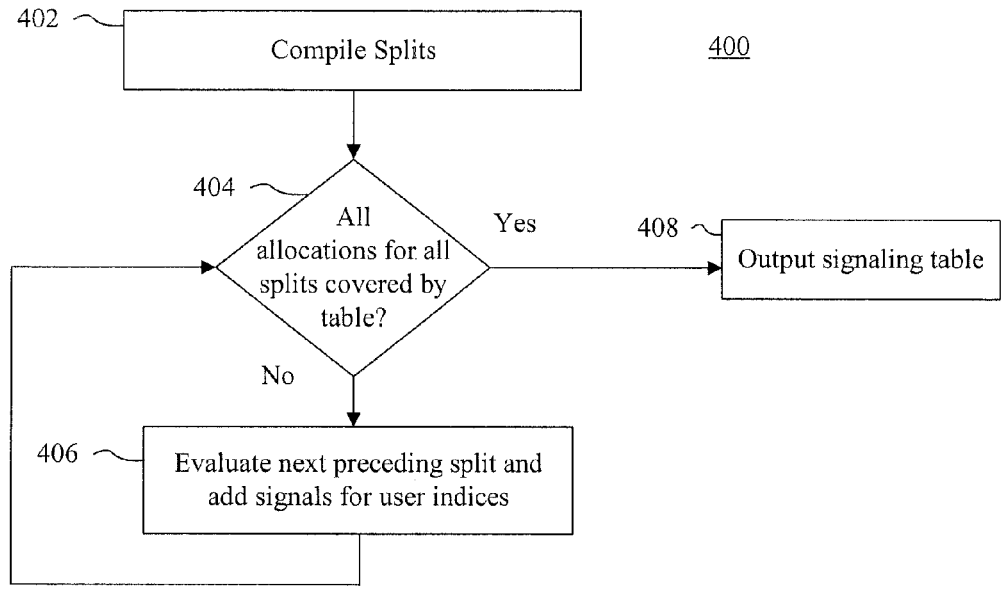
FIG. 4 is a high-level block/flow diagram of an embodiment of a method for designing signaling tables.

With reference now to FIG. 4, with continuing reference to FIGS. 1-3, an exemplary method 400 for designing one or more signaling tables is illustrated. The method 400 can be performed to implement step 206 described above. In accordance with the method 400, the generation of the table can be performed by considering the splits in preceding order, as opposed to the successive order in which the possibility table is generated in accordance with the method 300.

For example, the method 400 can begin at step 402, in which the processor can compile all of the splits for a given total number of streams, total number of users and total number of modulations. Continuing with the example in which K=2, 3, 4; M=3 and S=4, the processor can compile the three splits 1-1-1-1, 2-1-1 and 2-2 , At step 404, the processor can determine whether the signaling table covers all user-index allocations for each of the splits. If not, then the method can proceed to step 406, in which the processor evaluates the next preceding split and adds signals for user index allocations for the split. Continuing with the example, the processor can first consider the split 1-1-1-1 and can add 4×5 entries (or 4×15 entries if the user-modulation is not known) to cover all four user indices 0, 1, 2, 3. For example, the processor can add entries 19-38 (where the first entry is denoted as 0) in Table 4 for the 1-1-1-1 split.

Thereafter, the processor can return to and repeat step 404. Continuing with the example, the method may proceed to step 406, in which the processor evaluates the next preceding split, which in this example is the 2-1-1 split, and adds signals for user indices for this particular split. Here, the processor need not consider every possible signal for the 2-1-1 split. For example, the processor can only add five more entries (or 15 more entries if the user-modulation is not known) for the 2-1-1 split to cover the combined user index 0 and 1 because the user indices 2 and 3 have already been covered by the signals added for the 1-1-1-1 split. The five entries can correspond to entries 39-43 in Table 4. Accordingly, if for a preceding split the signals have already been determined, such duplicate signals need not be considered. This property can be achieved because of the successive design of the signaling table. Otherwise, if the design of signaling table is not successive, then all the signals for each split will have to be evaluated, in which case redundant entries might appear in the table.

Thereafter, the processor can return to and repeat step 404. Continuing with the example, the method may proceed to step 406, in which the processor evaluates the next preceding split, which is the 2-2 split, and adds signals for user indices for this split. Here, for the combined user index 2 and 3 in the split 2-2, the processor only adds two more entries (or six more entries if the user's modulation is not known to the user) to the signaling table, as the other signals were previously covered. The two entries can correspond to entries 44 and 45 in Table 4.

At step 404, if the processor determines that the signaling table covers all user-index allocations for each of the splits, then the processor can output the signaling table at step 406. The method 400 can be repeated for a different set of K, M and S.

It should be noted that, in certain situations, it is beneficial to have a set of signals reserved for unknown modulation types for the other users. In such cases, the user can still infer the total number of streams and its own stream index (or indices) and its own modulation (from this signal or some other signal), but it is not able to know the modulation types of the other streams. By using the same order of considering the splits as described above with respect to the successive design approach, for each split $S_1$-$S_2$-....-$S_K$, a signal can be reserved to indicate the user index such that duplicate signals from preceding splits are not considered.

To better illustrate features of the present principles, examples of possibility tables and signaling tables are provided below. In the following examples, it is assumed that the user's own modulation is conveyed to it via another signal from the base station. However, as noted above, the signaling tables can alternatively be constructed so that the indices therein also convey the modulation assigned to the user to which an index is directed. It should be noted that any one or more of the tables can be constructed in accordance with the method 200 described above. In addition, any one or more of the Possibility Tables 1-3 can be constructed in accordance with the method 300, described above, and any one or more of the Signaling Tables 4-12 can be constructed in accordance with the method 400, described above.

EXAMPLE 1

Up to 4 Total Streams, Up to 2 Streams Per User and 3 Modulations

The case of M=3 modulation types A, B, and C is considered. It is assumed that the total number of streams is $2 \geq S \geq 4$ and the maximum number of streams per user is two, i.e. L=2. The possible splits are as follows: 1-1, 1-1-1, 2-1, 1-1-1-1, 2-1-1, 2-2.

Table 1 below is constructed to encode the split 1-1 for the case that the total number of streams is S=2. It should be noted that the number to the left of each entry of the table is the index used for signaling, which can be referred to as the "All Stream Modulation Index" (ASMI).

TABLE 1

| ASMI Table For M = 3, S = 2 | |
| --- | --- |
| 0 | AA |
| 1 | BB |
| 2 | CC |
| 3 | AB |
| 4 | BC |
| 5 | CA |

Similarly, Table 2 is constructed, as described above, in order to encode both of the splits 1-1-1, 2-1 for the case of S=3.

TABLE 2

| ASMI Table For M = 3, S = 3 | |
| --- | --- |
| 6 | AAA |
| 7 | BBB |
| 8 | CCC |
| 9 | AAB |
| 10 | BBC |
| 11 | CCA |
| 12 | AAC |
| 13 | CCB |
| 14 | BBA |
| 15 | ABC |

Further, Table 3 is constructed to encode all three splits 1-1-1-1, 2-1-1, 2-2 for the case of S=4.

TABLE 3

| ASMI Table For M = 3, S = 4 | |
| --- | --- |
| 16 | AAAA |
| 17 | BBBB |
| 18 | CCCC |
| 19 | AABB |
| 20 | BBCC |
| 21 | CCAA |
| 22 | AAAB |
| 23 | BBBC |
| 24 | CCCA |
| 25 | AAAC |
| 26 | CCCB |
| 27 | BBBA |
| 28 | AABC |
| 29 | BBCA |
| 30 | CCAB |

It should be noted that Tables 1-3 can, of course, be combined into a single table.

Based on these three tables, the signal I sent to the users can be drawn from Table 4, which is an example of a signaling table and which can be constructed as described above with regard to the method 400. In this table, SI is the 'Stream Index' (or the set of stream indices) allocated to a given user and ASMI corresponds to possible entries in Tables 1-3. Table 4 utilizes about 5.5 bits to signal the modulation information, and corresponding stream indices, to each user. It should be noted that, in exemplary implementations of the signaling tables described herein, any of the co-scheduled users that are allocated a plurality of stream indices are assigned consecutive stream indices. However, it should be understood that other implementations can assign stream indices to the same user that are not consecutive.

TABLE 4

Modulation and Stream Indexing for up to S = 4 streams, L = 2, M = 3 without unknown modulation.

| I | S | SI | ASMI |
| --- | --- | --- | --- |
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 3 | 0 | 6 or 7 or 8 |
| 0x000101 | 3 | 0 | 9 or 10 or 11 |
| 0x000110 | 3 | 0 | 12 or 13 or 14 |
| 0x000111 | 3 | 0 | 15 |
| 0x001000 | 3 | 1 | 6 or 7 or 8 |
| 0x001001 | 3 | 1 | 9 or 10 or 11 |
| 0x001010 | 3 | 1 | 12 or 13 or 14 |
| 0x001011 | 3 | 1 | 15 |
| 0x001100 | 3 | 2 | 6 or 7 or 8 |
| 0x001101 | 3 | 2 | 9 or 10 or 11 |
| 0x001110 | 3 | 2 | 12 or 13 or 14 |
| 0x001111 | 3 | 2 | 15 |
| 0x010000 | 3 | 0 and 1 | 6 or 7 or 8 |
| 0x010001 | 3 | 0 and 1 | 9 or 10 or 11 |
| 0x010010 | 3 | 0 and 1 | 12 or 13 or 14 |
| 0x010011 | 4 | 0 | 16 or 17 or 18 |
| 0x010100 | 4 | 0 | 19 or 20 or 21 |
| 0x010101 | 4 | 0 | 22 or 23 or 24 |
| 0x010110 | 4 | 0 | 25 or 26 or 27 |
| 0x010111 | 4 | 0 | 28 or 29 or 30 |
| 0x011000 | 4 | 1 | 16 or 17 or 18 |
| 0x011001 | 4 | 1 | 19 or 20 or 21 |
| 0x011010 | 4 | 1 | 22 or 23 or 24 |
| 0x011011 | 4 | 1 | 25 or 26 or 27 |
| 0x011100 | 4 | 1 | 28 or 29 or 30 |
| 0x011101 | 4 | 2 | 16 or 17 or 18 |
| 0x011110 | 4 | 2 | 19 or 20 or 21 |
| 0x011111 | 4 | 2 | 22 or 23 or 24 |
| 0x100000 | 4 | 2 | 25 or 26 or 27 |
| 0x100001 | 4 | 2 | 28 or 29 or 30 |
| 0x100010 | 4 | 3 | 16 or 17 or 18 |
| 0x100011 | 4 | 3 | 19 or 20 or 21 |
| 0x100100 | 4 | 3 | 22 or 23 or 24 |
| 0x100101 | 4 | 3 | 25 or 26 or 27 |
| 0x100110 | 4 | 3 | 28 or 29 or 30 |
| 0x100111 | 4 | 0 and 1 | 16 or 17 or 18 |
| 0x101000 | 4 | 0 and 1 | 19 or 20 or 21 |
| 0x101001 | 4 | 0 and 1 | 22 or 23 or 24 |
| 0x101010 | 4 | 0 and 1 | 25 or 26 or 27 |
| 0x101011 | 4 | 0 and 1 | 28 or 29 or 30 |
| 0x101100 | 4 | 2 and 3 | 16 or 17 or 18 |
| 0x101101 | 4 | 2 and 3 | 19 or 20 or 21 |

Example 2

Up to 4 Streams, Up to 2 Streams Per User, 3 Modulations and Unknown Modulation

Here, a case is considered in which it is desirable to have options for not conveying the modulation information but still be able to signal the user index (indices). Possibility Tables 1-3 can be employed to generate Table 5 to accommodate this scenario. Table 5 utilizes less than 6 bits to signal the associated information to each user.

TABLE 5

Modulation and stream indexing for up to S = 4 streams, L = 2, M = 3 without unknown modulation

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 3 | 0 | 6 or 7 or 8 |
| 0x000101 | 3 | 0 | 9 or 10 or 11 |
| 0x000110 | 3 | 0 | 12 or 13 or 14 |
| 0x000111 | 3 | 0 | 15 |
| 0x000000 | 3 | 1 | 6 or 7 or 8 |
| 0x001001 | 3 | 1 | 9 or 10 or 11 |
| 0x001010 | 3 | 1 | 12 or 13 or 14 |
| 0x001011 | 3 | 1 | 15 |
| 0x001100 | 3 | 2 | 6 or 7 or 8 |
| 0x001101 | 3 | 2 | 9 or 10 or 11 |
| 0x001110 | 3 | 2 | 12 or 13 or 14 |
| 0x001111 | 3 | 2 | 15 |
| 0x010000 | 3 | 0 and 1 | 6 or 7 or 8 |
| 0x010001 | 3 | 0 and 1 | 9 or 10 or 11 |
| 0x010010 | 3 | 0 and 1 | 12 or 13 or 14 |
| 0x010011 | 4 | 0 | 16 or 17 or 18 |
| 0x010100 | 4 | 0 | 19 or 20 or 21 |
| 0x010101 | 4 | 0 | 22 or 23 or 24 |
| 0x010110 | 4 | 0 | 25 or 26 or 27 |
| 0x010111 | 4 | 0 | 28 or 29 or 30 |
| 0x010000 | 4 | 1 | 16 or 17 or 18 |
| 0x011001 | 4 | 1 | 19 or 20 or 21 |
| 0x011010 | 4 | 1 | 22 or 23 or 24 |
| 0x011011 | 4 | 1 | 25 or 26 or 27 |
| 0x011100 | 4 | 1 | 28 or 29 or 30 |
| 0x011101 | 4 | 2 | 16 or 17 or 18 |
| 0x011110 | 4 | 2 | 19 or 20 or 21 |
| 0x011111 | 4 | 2 | 22 or 23 or 24 |
| 0x100000 | 4 | 2 | 25 or 26 or 27 |
| 0x100001 | 4 | 2 | 28 or 29 or 30 |
| 0x100010 | 4 | 3 | 16 or 17 or 18 |
| 0x100011 | 4 | 3 | 19 or 20 or 21 |
| 0x100100 | 4 | 3 | 22 or 23 or 24 |
| 0x100101 | 4 | 3 | 25 or 26 or 27 |
| 0x100110 | 4 | 3 | 28 or 29 or 30 |
| 0x100111 | 4 | 0 and 1 | 16 or 17 or 18 |
| 0x100000 | 4 | 0 and 1 | 19 or 20 or 21 |
| 0x101001 | 4 | 0 and 1 | 22 or 23 or 24 |
| 0x101010 | 4 | 0 and 1 | 25 or 26 or 27 |
| 0x101011 | 4 | 0 and 1 | 28 or 29 or 30 |
| 0x101100 | 4 | 2 and 3 | 16 or 17 or 18 |
| 0x101101 | 4 | 2 and 3 | 19 or 20 or 21 |
| 0x101110 | 2 | 0 | Unknown |
| 0x101111 | 2 | 1 | Unknown |
| 0x110000 | 3 | 0 | Unknown |
| 0x110001 | 3 | 1 | Unknown |
| 0x110010 | 3 | 2 | Unknown |
| 0x110011 | 3 | 0 and 1 | Unknown |
| 0x110100 | 4 | 0 | Unknown |
| 0x110101 | 4 | 1 | Unknown |
| 0x110110 | 4 | 2 | Unknown |
| 0x110111 | 4 | 3 | Unknown |
| 0x110000 | 4 | 0 and 1 | Unknown |
| 0x111001 | 4 | 2 and 3 | Unknown |

The signaling capability can be further enhanced by adding the stream assignment for S=8 stream transmission with up to K=4 users. In this case, the following entries of Table 6 can be added to Table 5.

TABLE 6

An amendment to Table 5

| 0x101110 | 8 | 0 and 1 | Unknown |
| 0x111011 | 8 | 2 and 3 | Unknown |
| 0x111100 | 8 | 4 and 5 | Unknown |
| 0x111101 | 8 | 6 and 7 | Unknown |

Example 3

Up to 4 Streams, Up to 2 Streams Per User, Up to 2 Distinct Modulations Out of 3 Possible Modulations and Unknown Modulation A scenario that is similar to the case described in Example 2 is considered. Here, the specifications include options of not conveying the modulation information but instead the user index (indices) for all possible cases of S=8 streams with up to a maximum of L=2 streams per user. For this scenario, 12 new entries can be added to Table 5, which results in over six bits of signaling. However, in order to control the size of the entire signaling table within a six-bit budget, one possibility is to restrict the cases for which the modulation information is conveyed. For example, the cases in which all three distinct modulations are signaled simultaneously are dropped. Further, all possible cases for up to 2 distinct modulations is conveyed. Tables 1-3 can be employed as in Example 1 and Table 7 can be constructed to address this case. Table 7 utilizes only six bits to signal the associated information to each user.

TABLE 7

Modulation and stream indexing for up to S = 4 streams, L = 2, M = 3 with unknown modulation and at most two distinct modulations.

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 3 | 0 | 6 or 7 or 8 |
| 0x000101 | 3 | 0 | 9 or 10 or 11 |
| 0x000110 | 3 | 0 | 12 or 13 or 14 |
| 0x000111 | 3 | 1 | 6 or 7 or 8 |
| 0x001000 | 3 | 1 | 9 or 10 or 11 |
| 0x001001 | 3 | 1 | 12 or 13 or 14 |
| 0x001010 | 3 | 2 | 6 or 7 or 8 |
| 0x001011 | 3 | 2 | 9 or 10 or 11 |
| 0x001100 | 3 | 2 | 12 or 13 or 14 |
| 0x001101 | 3 | 0 and 1 | 6 or 7 or 8 |
| 0x001110 | 3 | 0 and 1 | 9 or 10 or 11 |
| 0x001111 | 3 | 0 and 1 | 12 or 13 or 14 |
| 0x010000 | 4 | 0 | 16 or 17 or 18 |
| 0x010001 | 4 | 0 | 19 or 20 or 21 |
| 0x010010 | 4 | 0 | 22 or 23 or 24 |
| 0x010111 | 4 | 0 | 25 or 26 or 27 |
| 0x010100 | 4 | 1 | 16 or 17 or 18 |
| 0x010101 | 4 | 1 | 19 or 20 or 21 |
| 0x010110 | 4 | 1 | 22 or 23 or 24 |
| 0x010111 | 4 | 1 | 25 or 26 or 27 |
| 0x011000 | 4 | 2 | 16 or 17 or 18 |
| 0x011001 | 4 | 2 | 19 or 20 or 21 |
| 0x011010 | 4 | 2 | 22 or 23 or 24 |
| 0x011011 | 4 | 2 | 25 or 26 or 27 |
| 0x011100 | 4 | 3 | 16 or 17 or 18 |
| 0x011101 | 4 | 3 | 19 or 20 or 21 |
| 0x011110 | 4 | 3 | 22 or 23 or 24 |
| 0x011111 | 4 | 3 | 25 or 26 or 27 |
| 0x100000 | 4 | 0 and 1 | 16 or 17 or 18 |
| 0x100001 | 4 | 0 and 1 | 19 or 20 or 21 |
| 0x100010 | 4 | 0 and 1 | 22 or 23 or 24 |
| 0x100011 | 4 | 0 and 1 | 25 or 26 or 27 |
| 0x100100 | 4 | 2 and 3 | 16 or 17 or 18 |
| 0x101101 | 4 | 2 and 3 | 19 or 20 or 21 |
| 0x100110 | 2 | 0 | Unknown |

TABLE 7-continued

Modulation and stream indexing for up to S = 4 streams, L = 2, M = 3 with unknown modulation and at most two distinct modulations.

| I | S | SI | ASMI |
|---|---|---|---|
| 0x100111 | 2 | 1 | Unknown |
| 0x101000 | 3 | 0 | Unknown |
| 0x101001 | 3 | 1 | Unknown |
| 0x101010 | 3 | 2 | Unknown |
| 0x101011 | 3 | 0 and 1 | Unknown |
| 0x101100 | 4 | 0 | Unknown |
| 0x101101 | 4 | 1 | Unknown |
| 0x101110 | 4 | 2 | Unknown |
| 0x101111 | 4 | 3 | Unknown |
| 0x110000 | 4 | 0 and 1 | Unknown |
| 0x110001 | 4 | 2 and 3 | Unknown |
| 0x110010 | 8 | 0 | Unknown |
| 0x110011 | 8 | 1 | Unknown |
| 0x110100 | 8 | 2 | Unknown |
| 0x110101 | 8 | 3 | Unknown |
| 0x110110 | 8 | 4 | Unknown |
| 0x110111 | 8 | 5 | Unknown |
| 0x111000 | 8 | 6 | Unknown |
| 0x111001 | 8 | 7 | Unknown |
| 0x111010 | 8 | 0 and 1 | Unknown |
| 0x111011 | 8 | 2 and 3 | Unknown |
| 0x111100 | 8 | 4 and 5 | Unknown |
| 0x111101 | 8 | 6 and 7 | Unknown |

Example 4

Up to 4 Streams, 3 Modulations for Up to 2 Streams and Unknown Modulation for all Cases A scenario in which there are up to four possible streams is considered. Here, options of unknown modulation for all cases of up to 4 possible streams are provided. However, at the same time, modulation information for two-stream transmission is conveyed. Tables 1-3 can be employed as possibility tables and Table 8 can be constructed to accommodate this scenario. Table 8 utilizes exactly four bits to signal the associated information to each user and it is the optimal signaling in this case.

TABLE 8

Stream indexing for S = 2, 3, 4, L = 2, M = 3 with unknown modulation and modulation information only for S = 2.

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 2 | 0 | Unknown |
| 0x000101 | 2 | 1 | Unknown |
| 0x000100 | 3 | 0 | Unknown |
| 0x000111 | 3 | 1 | Unknown |
| 0x001010 | 3 | 2 | Unknown |
| 0x001001 | 3 | 0 and 1 | Unknown |
| 0x001000 | 4 | 0 | Unknown |
| 0x001011 | 4 | 1 | Unknown |
| 0x001110 | 4 | 2 | Unknown |
| 0x001101 | 4 | 3 | Unknown |
| 0x001100 | 4 | 0 and 1 | Unknown |
| 0x001111 | 4 | 2 and 3 | Unknown |

Example 5

Up to 4 Streams, 3 Modulations for Up to 3 Streams and Unknown Modulation for all Cases As in Example 4, a case in which there are up to four possible streams is considered. Further, options of unknown modulation for all cases of up to four possible streams are provided. However, modulation information for two or three stream transmission is conveyed. Tables 1-3 can be employed as possibility tables and Table 9 can be constructed and employed as a signaling table. Table 9 utilizes not more than five bits to signal the associated information to each user in this case.

TABLE 9

Modulation and Stream Indexing for S = 2, 3, 4, L = 2, M = 3 with unknown modulation and modulation information only for S = 2 and S = 3.

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 3 | 0 | 6 or 7 or 8 |
| 0x000101 | 3 | 0 | 9 or 10 or 11 |
| 0x000110 | 3 | 0 | 12 or 13 or 14 |
| 0x000111 | 3 | 0 | 15 |
| 0x001000 | 3 | 1 | 6 or 7 or 8 |
| 0x001001 | 3 | 1 | 9 or 10 or 11 |
| 0x001010 | 3 | 1 | 12 or 13 or 14 |
| 0x001011 | 3 | 1 | 15 |
| 0x001100 | 3 | 2 | 6 or 7 or 8 |
| 0x001101 | 3 | 2 | 9 or 10 or 11 |
| 0x001110 | 3 | 2 | 12 or 13 or 14 |
| 0x001111 | 3 | 2 | 15 |
| 0x010000 | 3 | 0 and 1 | 6 or 7 or 8 |
| 0x010001 | 3 | 0 and 1 | 9 or 10 or 11 |
| 0x010010 | 3 | 0 and 1 | 12 or 13 or 14 |
| 0x010011 | 3 | 0 | Unknown |
| 0x010100 | 3 | 1 | Unknown |
| 0x010101 | 3 | 0 | Unknown |
| 0x010110 | 3 | 1 | Unknown |
| 0x010111 | 3 | 2 | Unknown |
| 0x011000 | 3 | 0 and 1 | Unknown |
| 0x011001 | 4 | 0 | Unknown |
| 0x011010 | 4 | 1 | Unknown |
| 0x011011 | 4 | 2 | Unknown |
| 0x011100 | 4 | 3 | Unknown |
| 0x011101 | 4 | 0 and 1 | Unknown |
| 0x011110 | 4 | 2 and 3 | Unknown |

Example 6

Up to 4 Streams, Up to 2 Distinct Modulations for Up to 3 Streams and 2-2 Splits, and Unknown Modulation for all Cases In this example, it is assumed that an unknown modulation and an associated stream index can be signaled only for all the cases associated with up to four users. In addition, up to two distinct modulations for S=2 and S=3 streams are signaled and the modulations for all the cases of the 2-2 split for S=4 streams is signaled. Table 10 below can be designed based on Tables 1-3 for this scenario. Table 10 utilizes exactly five bits to signal the associated information to each user in this case.

TABLE 10

Stream indexing for S = 2, 3, 4, L = 2 with unknown modulation, up to two distinct modulations for S = 2 and S = 3 streams and only 2-2 splits for the case of S = 4 streams.

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 3 or 4 or 5 |
| 0x000100 | 3 | 0 | 6 or 7 or 8 |
| 0x000101 | 3 | 0 | 9 or 10 or 11 |
| 0x000110 | 3 | 0 | 12 or 13 or 14 |
| 0x000111 | 3 | 1 | 6 or 7 or 8 |
| 0x001000 | 3 | 1 | 9 or 10 or 11 |
| 0x001001 | 3 | 1 | 12 or 13 or 14 |
| 0x001010 | 3 | 2 | 6 or 7 or 8 |
| 0x001011 | 3 | 2 | 9 or 10 or 11 |
| 0x001100 | 3 | 2 | 12 or 13 or 14 |
| 0x001101 | 3 | 0 and 1 | 6 or 7 or 8 |
| 0x001110 | 3 | 0 and 1 | 9 or 10 or 11 |
| 0x001111 | 3 | 0 and 1 | 12 or 13 or 14 |
| 0x010000 | 4 | 0 and 1 | 16 or 17 or 18 |
| 0x010001 | 4 | 0 and 1 | 19 or 20 or 21 |
| 0x010010 | 4 | 2 and 3 | 16 or 17 or 18 |
| 0x010011 | 4 | 2 and 3 | 19 or 20 or 21 |
| 0x010100 | 2 | 0 | Unknown |
| 0x010101 | 2 | 1 | Unknown |
| 0x010110 | 3 | 0 | Unknown |
| 0x010111 | 3 | 1 | Unknown |
| 0x011000 | 3 | 2 | Unknown |
| 0x011001 | 3 | 0 and 1 | Unknown |
| 0x011010 | 4 | 0 | Unknown |
| 0x011011 | 4 | 1 | Unknown |
| 0x011100 | 4 | 2 | Unknown |
| 0x011101 | 4 | 3 | Unknown |
| 0x011110 | 4 | 0 and 1 | Unknown |
| 0x011111 | 4 | 2 and 3 | Unknown |

Example 7

Up to 8 Streams and Up to 4 Users with at Most 2 Streams Per User

In some cases, the modulation information may not be conveyed at all, but different users may be allocated different numbers of streams. To encode all such cases, only the splits can be considered. As such, in this case, only different splits may occur. Thus, all the possible splits can be enumerated and can be employed to generate a signaling table using signaling for each user of each split in accordance with the procedure described above. Table 11 is one sufficient signaling table for this specific example. Here, all possible splits are as follows: 1-1, 1-1-1, 2-1, 1-1-1-1, 2-1-1, 2-2, 2-1-1-1, 2-2-1, 2-2-1-1, 2-2-2, 2-2-2-1, 2-2-2-2.

TABLE 11

Stream indexing for up to S = 8, up to K = 4 users and up to L = 2 streams per user with unknown modulation.

| I | S | SI | ASMI |
|---|---|---|---|
| 0x000000 | 2 | 0 | unknown |
| 0x000001 | 2 | 1 | unknown |
| 0x000010 | 3 | 0 | unknown |
| 0x000011 | 3 | 1 | unknown |
| 0x000100 | 3 | 2 | unknown |
| 0x000101 | 4 | 0 and 1 | unknown |
| 0x000110 | 4 | 0 | unknown |
| 0x000111 | 4 | 1 | unknown |
| 0x001000 | 4 | 2 | unknown |
| 0x001001 | 4 | 3 | unknown |
| 0x001010 | 4 | 0 and 1 | unknown |
| 0x001011 | 4 | 2 and 3 | unknown |
| 0x001100 | 5 | 0 and 1 | unknown |
| 0x001101 | 5 | 2 | unknown |
| 0x001110 | 5 | 3 | unknown |
| 0x001111 | 5 | 4 | unknown |
| 0x010000 | 5 | 2 and 3 | unknown |
| 0x010001 | 6 | 0 and 1 | unknown |
| 0x010010 | 6 | 2 and 3 | unknown |
| 0x010011 | 6 | 4 | unknown |
| 0x010100 | 6 | 5 | unknown |
| 0x010110 | 7 | 0 and 1 | unknown |
| 0x010111 | 7 | 2 and 3 | unknown |
| 0x011000 | 7 | 4 and 5 | unknown |
| 0x011001 | 7 | 6 | unknown |
| 0x011010 | 8 | 0 and 1 | unknown |
| 0x011011 | 8 | 2 and 3 | unknown |
| 0x011100 | 8 | 4 and 5 | unknown |
| 0x011101 | 8 | 6 and 6 | unknown |

Example 8

Unknown Modulation for 2, 3, 4, and 8 Streams. Modulation Information for 1-1 Split and 2-2 Split with M=3, L=2.

In accordance with another example, the stream index (indices) for all the cases of 2, 3, 4, and 8 total number of streams with up to two streams per user is conveyed. In addition, the modulation for three possible modulation types for two possible splits, 1-1 and 2-2, is also conveyed. Possibility Tables 1-3 can be employed to generate the signaling Table 12 for this scenario. Table 12 utilizes exactly 5 bits to signal the associated information to each user in this case.

TABLE 12

Stream indexing for S = 2, 3, 4, 8 with unkown modulation and modulation information only for 1-1 split and 2-2 split with L = 2, M = 3.

| I | S | SI | ASMI |
|---|---|---|---|
| 0x000000 | 2 | 0 | 0 or 1 or 2 |
| 0x000001 | 2 | 0 | 3 or 4 or 5 |
| 0x000010 | 2 | 1 | 0 or 1 or 2 |
| 0x000011 | 2 | 1 | 2 or 4 or 5 |
| 0x000100 | 4 | 0 and 1 | 16 or 17 or 18 |
| 0x000101 | 4 | 0 and 1 | 19 or 20 or 21 |
| 0x000110 | 4 | 2 and 3 | 16 or 17 or 18 |
| 0x000111 | 4 | 2 and 3 | 19 or 20 or 21 |
| 0x001000 | 2 | 0 | unknown |
| 0x001001 | 2 | 1 | unknown |
| 0x001010 | 3 | 0 | unknown |
| 0x001011 | 3 | 1 | unknown |
| 0x001100 | 3 | 2 | unknown |
| 0x001101 | 3 | 0 and 1 | unknown |
| 0x001110 | 4 | 0 | unknown |
| 0x001111 | 4 | 1 | unknown |
| 0x010000 | 4 | 2 | unknown |
| 0x010001 | 4 | 3 | unknown |
| 0x010010 | 4 | 0 and 1 | unknown |
| 0x010011 | 4 | 2 and 3 | unknown |
| 0x010100 | 8 | 0 | unknown |
| 0x010101 | 8 | 1 | unknown |
| 0x010110 | 8 | 2 | unknown |
| 0x010111 | 8 | 3 | unknown |
| 0x011000 | 8 | 4 | unknown |
| 0x011001 | 8 | 5 | unknown |
| 0x011010 | 8 | 6 | unknown |

TABLE 12-continued

Stream indexing for S = 2, 3, 4, 8 with unkown modulation and modulation information only for 1-1 split and 2-2 split with L = 2, M = 3.

| I | S | SI | ASMI |
|---|---|---|---|
| 0x011011 | 8 | 7 | unknown |
| 0x011100 | 8 | 0 and 1 | unknown |
| 0x011101 | 8 | 2 and 3 | unknown |
| 0x011110 | 8 | 4 and 5 | unknown |
| 0x011111 | 8 | 6 and 7 | unknown |

Figure 5:
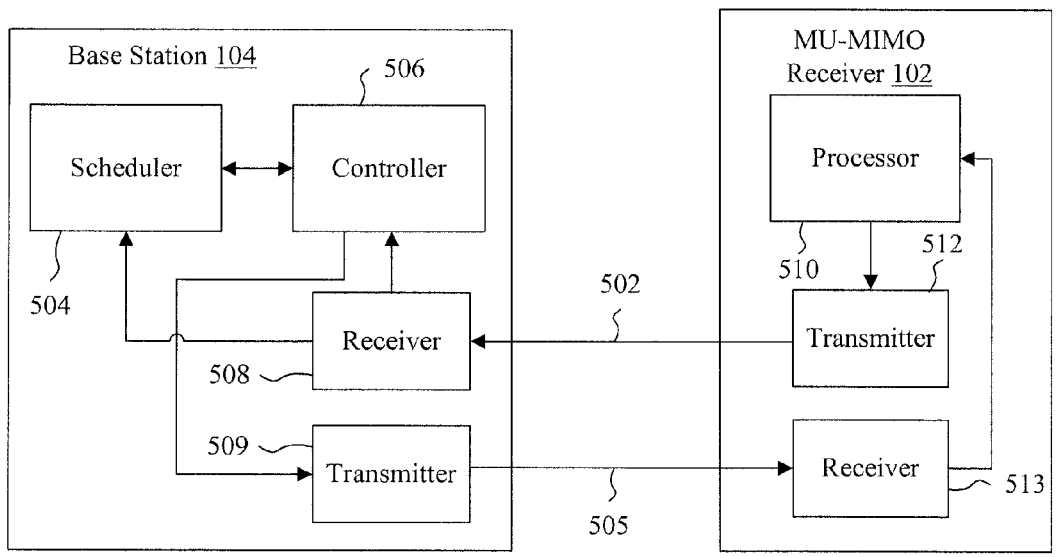
FIG. 5 is a high-level block/flow diagram of a base station system and a user/receiver system in accordance with an exemplary embodiment of the present invention.

With reference now to FIG. 5 with continuing reference to FIGS. 1-4, exemplary implementations of a base station system 104 and a MU-MIMO receiver or user system 102 are illustrated. The base station 104 can include a scheduler 504, a controller 506, a receiver 508 and a transmitter 509. In addition, the user system 102 can include a processor 510, a transmitter 512 and a receiver 513. The base station 104 and the user 102 can communicate through one or more uplink control channels 502, on which the user can employ a transmitter 512 to transmit control information to the receiver 508 at the base station 104. In turn, the base station 104 can employ the transmitter 509 to transmit control information along one or more downlink control channels 505 to the receiver 513 in the user system 102. Further, the base station system 104 and the receiver system 102 can include respective storage mediums (not shown) on which programs of instructions can be stored for execution by the controller 506 and processor 510, respectively. The functions of particular elements of the systems 102 and 104 are described in more detail herein below with respect to method embodiments. It should be noted, however, that the methods 200, 300 and/or 400 can be performed by the controller 506. For example, the controller 506 can execute programs of instructions embodying any one or more of these methods that are stored on its respective storage medium.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
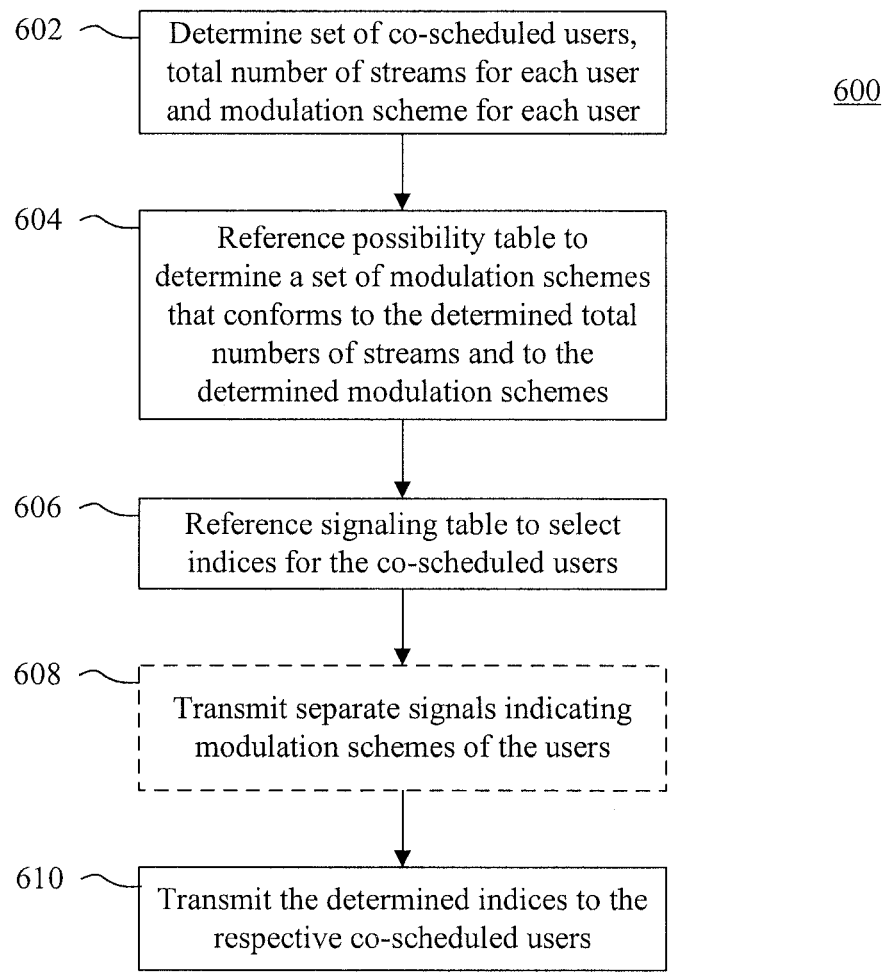
FIG. 6 is a high-level block/flow diagram of an embodiment of a method for conveying modulation information of co-scheduled users.

Referring now to FIG. 6, with continuing reference to FIG. 5, a method 600 for conveying modulation information of co-scheduled users in accordance with an exemplary embodiment is illustrated. The method 600 can be performed by the base station 104 and can begin at step 602, in which the scheduler 504 of the base station 104 can determine a set of co-scheduled users, a total number of streams for each user and a modulation scheme for each user. The determination can be made for any particular value of K, M, S and L. Moreover, the determination can be made in accordance with a variety of methods available in the relevant literature. For example, the determination can be based on feedback from the user 102 transmitted through the uplink channel 502. The feedback can include a preferred precoder and/or a channel quality index (CQI), for example. For expository purposes, a case is considered in which S=4 total streams, M=3 different modulation schemes, K=3 different users and L=2 maximum streams per user. In this exemplary case, the scheduler 504 determines, at step 602, that user-1 is to be scheduled one stream with modulation A, user-2 is to be scheduled one stream with modulation C and user-3 is to be scheduled two streams with modulation B. Accordingly, the case corresponds to a 2-1-1 split.

At step 604, the controller 506 can reference a possibility table to determine a set of modulation schemes that conforms to the determined total numbers of streams for each of the users and to the determined modulation schemes for each of the users. For example, at step 604, the controller 506 can reference any possibility table that is constructed in accordance with the method 200 and/or 300. Continuing with the case considered at step 602, the controller 506 can employ Table 3 as the possibility table and can select the set of modulation schemes "BBCA" in entry 29 as the set or combination of modulation schemes that conforms to the determined 2-1-1 split and to the modulation schemes determined for each of the users at step 602.

At step 606, the controller 506 can reference a signaling table to select indices for transmission to the co-scheduled users that denote the set of modulation schemes determined at step 604. For example, at step 606, the controller 506 can reference any signaling table that is constructed in accordance with the method 200 and/or 400. Continuing with the case considered at step 602, the controller 506 can employ Table 4 as the signaling table and can select the appropriate indices by reference thereto. For example, the controller 506 can select indices 100110, 100001 and 101011, each of which denote entry 29 in Table 3, "BBCA." In particular, the controller 506 can select, for user-1, index 100110 denoting the stream index 3 for the set or combination of modulation schemes corresponding to entry 29 in Table 3, "BBCA." Similarly, the controller 506 can select, for user-2, index 100001 denoting the stream index 2 for the set or combination of modulation schemes "BBCA." Further, the controller 506 can select, for user-3, index 101011 denoting the stream indices 0 and 1 for the set or combination of modulation schemes "BBCA." As stated above, Table 4 was constructed with the assumption that each user was informed of its respective modulation scheme by a separate signal or through a separate source. However, as indicated above, the base station 104 can alternatively employ a signaling table having indices that can convey the users' modulation scheme in addition to those of co-scheduled users.

Thus, at optional step 608, the controller 506 can direct the transmitter 509 to transmit respective signals, separate from the signals transmitted at step 610, to each user in the set of user determined at step 602. In particular, each signal can indicate a modulation scheme assigned to the user to which the signal is directed. For example, continuing with the case considered at step 602, the transmitter 509 can transmit to user-1 a signal indicating that user-1 is assigned modulation scheme A. Similarly, the transmitter 509 can transmit to user-2 a signal indicating that user-2 is assigned modulation scheme C and can transmit to user-3 a signal indicating that user-3 is assigned modulation scheme B.

At step 610, the controller 506 can direct the transmitter 509 to transmit a different one of the selected indices to each of the respective users. For example, the transmitter 509 can transmit the index 100110 to user-1, can transmit the index 100001 to user-2 and can transmit the index 101011 to user-3. As indicated in more detail below, the indices permit each of the users to determine the modulation schemes assigned to at least one other co-scheduled user.

Figure 7:
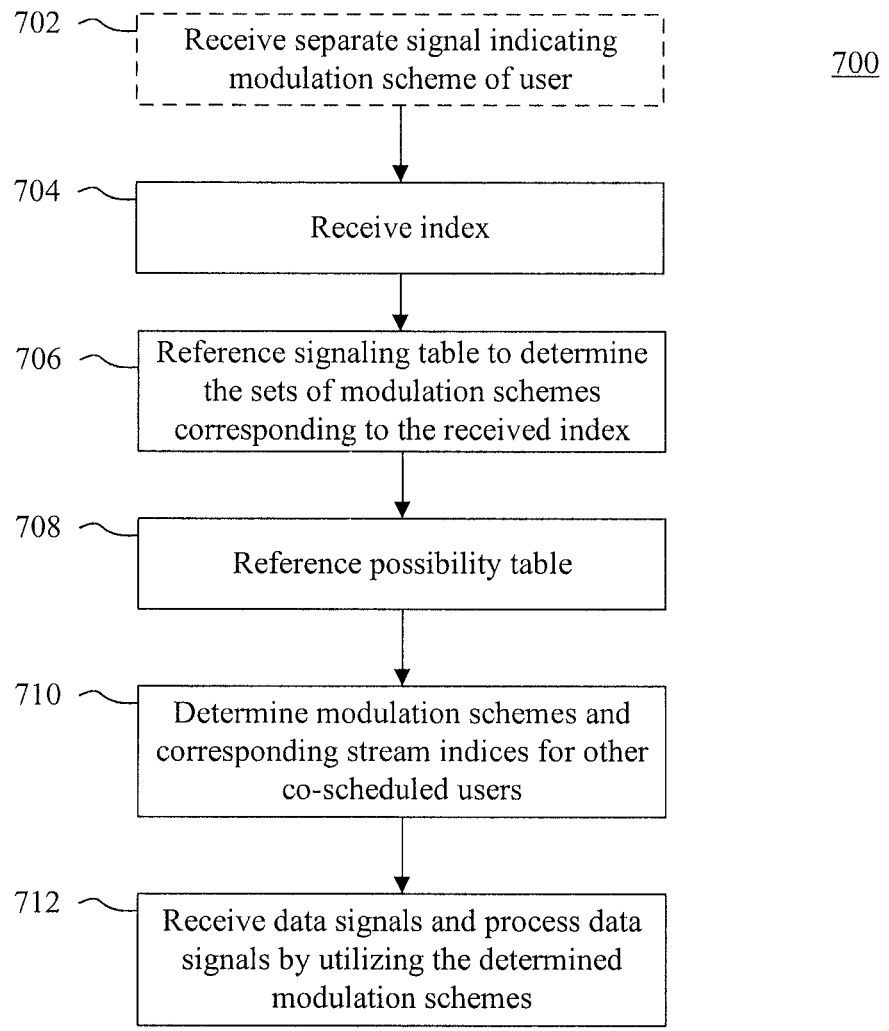
FIG. 7 is a high-level block/flow diagram of an embodiment of a method for determining modulation information of co-scheduled users.

Referring now to FIG. 7, with continuing reference to FIGS. 5 and 6, a method 700 for determining modulation information of co-scheduled users in accordance with an exemplary embodiment is illustrated. The method 700 can be performed by the user 102 and can complement the method 600. The method 700 can begin at optional step 702, in which the receiver 513 of the user 102 can receive a signal from the base station 104 indicating a modulation scheme that is assigned to the user 102. For example, the signal can be a signal that is sent in accordance with step 608 of the method 600. Thus, continuing with the case considered in the method 600 and assuming that user-2 is performing the method 700, the receiver 513 can receive an indication that the modulation scheme C is assigned to the user-2 and can transmit the indication to the processor 510.

At step 704, the receiver 513 can receive an index and can transmit the index to the processor 510. For example, the index can be transmitted from the base station 104 to the user 102 in accordance with step 610 of the method 600. Thus, continuing with the case considered at step 702, the user-2 can receive the index 100001.

At step 706, the processor 510 can reference a signaling table to determine a corresponding plurality of different sets of modulation schemes denoted by the received index. For example, at step 706, the controller 506 can reference any signaling table that is constructed in accordance with the method 200 and/or 400. Here, any one or more indices of the signaling table can denote a plurality of different sets of modulation schemes. Continuing with the case considered at step 702, the processor 510 can employ Table 4 as the signaling table and can cross-reference the received index 100001 to entries 28, 29 and 30 in Table 3. Thus, at step 708, the processor 510 can reference a possibility table to thereby determine the sets or combinations of modulations schemes corresponding to the received index. For example, continuing with the case considered at step 702, the processor 510 can reference entries 28, 29 and 30 in Table 3 to thereby determine the sets or combinations of modulations schemes corresponding to the received index as follows: "AABC," "BBCA" and "CCAB." Further, the received index also can indicate a total number of co-scheduled schemes. For example, Table 4 indicates that the received index 100001 corresponds to a total number of four co-scheduled schemes (i.e., S=4).

At step 710, the processor 510 can determine the modulation schemes and corresponding stream indices for other co-scheduled users based on the referencing of the tables. Continuing with the example considered above, the processor 510 of the user-2 can select one of the three sets or combinations of modulation schemes based on its known modulation scheme and on its assigned index. For example, the signaling table employed by the user-2 indicates that the received index 100001 corresponds to an assignment of stream index 2 to the user-2. In addition, the user-2 is aware that its assigned modulation scheme is C, either due to a separate signal or through the signaling table itself. Further, the sets of modulation schemes in the possibility table are ordered in accordance with stream indices, with stream index zero denoting the left-most element of a set or combination, stream index 1 denoting the next element of the set or combination, etc. Thus, each set or combination of modulation schemes in the possibility table can convey a stream index for each of the modulation schemes in the respective set. Accordingly, of the three choices "AABC," "BBCA" and "CCAB," the processor 510 selects "BBCA," as it is the only choice that has modulation scheme C assigned to stream index 2. As such, the processor 510 determines that the data streams corresponding to stream indices 0 and 1 are modulated with modulation scheme B and the data stream corresponding to stream index 3 is modulated with modulation scheme A. The use of the signaling and the possibility table in this manner is especially beneficial because the same index can be used to denote multiple possible sets or combinations of modulation schemes, thereby reducing the size of the signaling table employed and, as a result, the number of bits employed to signal a given index in the table. Conversely, within a given bit budget, a relatively greater number of cases or possibilities can be signaled by using the approaches described herein. These properties are enabled, for example, by the use of splits and the invariance with respect to stream assignments to users that is utilized in the split concept. As indicated above, a split can simply be a sequence of total numbers of streams respectively allocated to any given co-scheduled users that is arranged in decreasing order. Further, the possibility and the signaling tables can be structured in accordance with splits.

At step 712, the user 102 can receive data signals and can process the data signals by utilizing the determined modulation schemes and their corresponding stream indices. For example, in the case considered above, the receiver 513 of the user-2 can receive the data signals on resources corresponding to the assigned stream index 2 and the processor 510 can use the determined modulation schemes of the co-scheduled users to perform interference cancellation and to generate more reliable LLRs for the user's codewords while the processor 510 performs modulation-aware demodulation of the data signals, as mentioned above.

As also described above, other exemplary embodiments of the present principles are directed to selective joint demodulation. It should be noted that any of the methods and systems described above can be employed to implement these embodiments. In particular, the conveyance of modulation schemes assigned to other co-scheduled users can be utilized in the selective joint demodulation embodiments. To better illustrate aspects of selective joint demodulation in accordance with aspects of the present principles, a system model is considered.

Specifically, a narrowband received signal model at a user terminal of interest, referred to as user-1, that is equipped with N receive antennas is considered, where the base station has M transmit antennas:

$$y = H^\dagger x + \eta \qquad (1)$$

where y is the received signal at user-1, $H \in \mathbb{C}^{M \times N}$ is the channel matrix and $\eta$ is the additive noise. It is assumed that the model in (1) has been obtained after an interference whitening step so that $E[\eta \eta^\dagger] = I$ and it is further assumed that $\eta$ is a vector with independent and identically distributed (i.i.d.) zero-mean complex Gaussian elements. The signal vector x transmitted by the base station can be expanded as $$x = \sqrt{\rho'} \sum_{k \in \upsilon} V_k s_k \qquad (2)$$

where $\upsilon$ is the set of users that are scheduled. $V_k$ is an $M \times r_k$ semi-unitary matrix with $V_k^\dagger V_k = I_{r_k}$ and $s_k$ is the $r_k \times 1$ symbol vector corresponding to user $k \in \upsilon$ whose elements are drawn from a unit average energy quadrature amplitude modulation constellation. However, it should be noted that other modulation schemes can be employed. Further, let $$S = \sum_{k \in \upsilon} r_k$$

be the total number of streams that are co-scheduled. Each scheduled stream is assigned an identical power $\rho'$. The set of precoding matrices or vectors $\{V_k\}_{k \in \upsilon}$ are determined by first selecting a set $\upsilon$ of users that have reported mutually (near-) orthogonal matrices or vectors $\{G_k\}_{k \in \upsilon}$ and which also yield a high weighted sum rate. For example, as noted above, the users can transmit preferred precoders or CQIs to the base station, which can enable the base station to determine the preferred precoders for any given user. The base station can then either set $V_k = G_k \forall k \in \upsilon$ or it can use any appropriate technique on $\{G_k\}_{k \in \upsilon}$ to determine $\{V_k\}_{k \in \upsilon}$. The base station also transmits precoded pilots for all scheduled users to whom data is transmitted, where the precoded pilots for the streams of user k are precoded using $\sqrt{\rho'} V_k$. Moreover, the precoded pilots for different streams are sent along different (near) orthogonal dimensions in the time—frequency—spreading-code space. Each scheduled user is aware of the $$\sum_{k \in \upsilon} r_k$$

(near) orthogonal dimensions and also knows the dimensions on which the precoded pilots for its desired streams are sent. The $$\sum_{k \in \upsilon} r_k$$

dimensions can, for example, be indicated to the user in the form of stream indices in accordance with the methods described above. The user can thus estimate the columns of its equivalent channel matrix corresponding to all the streams of all the co-scheduled users (UEs) with indices in $\upsilon$. For example, user-1 can estimate $\sqrt{\rho'} H^\dagger V_k$ using the precoded pilots of the $r_k$ streams of user $k \in \upsilon$. User-1 can do so, as the precoded pilots for different streams are transmitted along different near-orthogonal dimensions, which makes them resolvable by each scheduled user.

In some scenarios, the base station may not have enough data to transmit for some of the users in $\upsilon$. In this case, the base station only transmits data to a subset $\bar{\upsilon} \subset \upsilon$ instead. Due to signaling constraints, the base station may also not be able to inform the scheduled users that some users in $\upsilon$ are missing, i.e., no data will be transmitted for these users (with indices in the set $\upsilon \backslash \bar{\upsilon}$). However, the base station will not transmit precoded pilots corresponding to the "missing" users.

Suppose that the user of interest (user-1) is in $\bar{\upsilon}$. Now, if no pilots are transmitted for some user $q \in \upsilon \backslash \bar{\upsilon}$, then the corresponding estimate by user-1 will have a much lower energy (or norm) compared to the energy of the corresponding estimate by user-1 when a pilot is indeed transmitted for user q. Thus, by using a suitable threshold on the energy of the estimate, user-1 can decide that user q is missing only if the energy (or norm) of the corresponding estimate is below the threshold. Proceeding in this way, let $\hat{\upsilon}$ be the set of users that user-1 deems are not missing. Also, let $J \subset \upsilon$ denote the set of users whose corresponding modulations are known to user-1 and clearly $1 \in \upsilon$. It should be noted that the modulations of the users in $J \subset \upsilon$ can be conveyed to user-1 by the base station using, for example, methods 600 and 700. However, as noted above, the base station may not be able to convey that some of the users in J are "missing." Then, $v = \hat{\upsilon} \cap J$ is the set of users whose modulations are known to user-1 and which are deemed non-missing by user-1.

In the sequel, the phrase joint demodulation using symbols of all users in a set A (where $1 \in A$) is used to include any rule that generates LLRs for coded bits mapped to the symbols in $s_1$ after considering one or more values for all symbols (from their respective assumed constellations) transmitted by all users in A.

Suppose that, due to complexity constraints, together with the $r_1$ symbols of user-1, the receiver of user-1 can afford to perform joint demodulation using at-most Q other symbols corresponding to one or more users in $\hat{\upsilon} \backslash 1$. The limits on the number of symbols used for joint demodulation can be based, for example, on the processing time of the hardware receiver, or other constraints. Define a matrix $B = \sqrt{\rho'} H^\dagger [V_1, \{V_k\}_{k \in \hat{\upsilon} \backslash 1}]$ and note that the user-1 assumes a model $$y = Bs + \eta, \qquad (3)$$

where s denotes the vector formed by the symbols transmitted to the users in $\hat{\upsilon}$. One important point is that the LLRs should be generated only for the coded bits mapped to the symbols in $s_1$. It should be further noted that, in order to generate these LLRs, no information about the coding rates employed to serve any user in $\hat{\upsilon}$ is needed.

Let $B_1$ be the sub-matrix of B formed by the $r_1$ columns corresponding to user-1 and let C be the sub-matrix of B formed by the remaining $$W = \sum_{j \in \hat{\upsilon} \backslash 1} r_j$$

columns. It is noted that user-1 can assign $k^{th}$ column of C and the corresponding modulation (if known) to a virtual user k. Now the complexity constraints can be modeled by enforcing that the receiver can jointly demodulate the symbols of user-1 together with symbols of up-to Q other virtual users. Thus, an equivalent formulation is that the user first determines that W virtual users are present (out of a possible $$\sum_{j \in \mathcal{U} \backslash 1} r_j$$

of such virtual users), then selects up-to Q other virtual users from W virtual users (that are deemed present) and uses the selected virtual users for joint demodulation after suppressing the remaining non-selected virtual users via, for example, linear MMSE (minimum mean square error) filtering.

To further the efficiency of the receiver under such a constraint, the following scheme can be employed. Let $c_k$ denote the column of C corresponding to the virtual user k. If the modulation (or constellation) of user-k is known, then let $S_k$ be re-defined herein below to denote its constellation and let $R_k = \log(|S_k|)$ be the (un-coded) rate of virtual user k and $\Gamma_k$ to be a penalty factor which attempts to capture the fact that $S_k$ is a non-Gaussian finite alphabet. Let $S_1, R_1 = a_1 r_1 \log(|S_k|)$ and $\Gamma_1$ denote the constellation, rate and penalty factor of user-1, respectively, with $R_1$ being the un-coded rate when $a_1 = 1$ and $R_1$ denoting the coded rate when $a_1$ is equal to the outer code rate of user-1. Further, when the modulation of user-k is unknown, set $S_k = \phi$, wherein $\phi$ denotes an empty set, and set $\Gamma_k, R_k$ to be pre-defined values. The receiver or user should use an incomplete-modulation-selection rule to select a suitable subset of up-to Q other virtual users. Such a rule can use the matrix B as well as $\{S_1, R_1, \Gamma_1\}$ and $\{S_k, R_k, \Gamma_k\}_{k \neq 1}$, where the latter correspond to the virtual users. Let $\{c_m\}$, $m \in D$ be the columns of C selected by such a selection rule such that $|D| \leq Q$. The receiver then suppresses the virtual users from W that are not in D using a linear filter $$F = \left( I + \sum_{k \notin D} c_k c_k^\dagger \right)^{-1/2}$$

to obtain $$\tilde{z} = Fz = \underbrace{F[B_1, C_D]}_{M}[s_1; s_D] + \hat{\eta} \qquad (4)$$

where $E[\eta \eta^\dagger] = I$ and $C_D(S_D)$ consists of the columns of C (elements of s) whose corresponding virtual users are in D. The receiver or user can now jointly demodulate the symbols in $[s_1; s_D]$ using the model (4) with the understanding that LLRs should be generated only for the coded bits mapped to the symbols in $s_1$.

Figure 8:
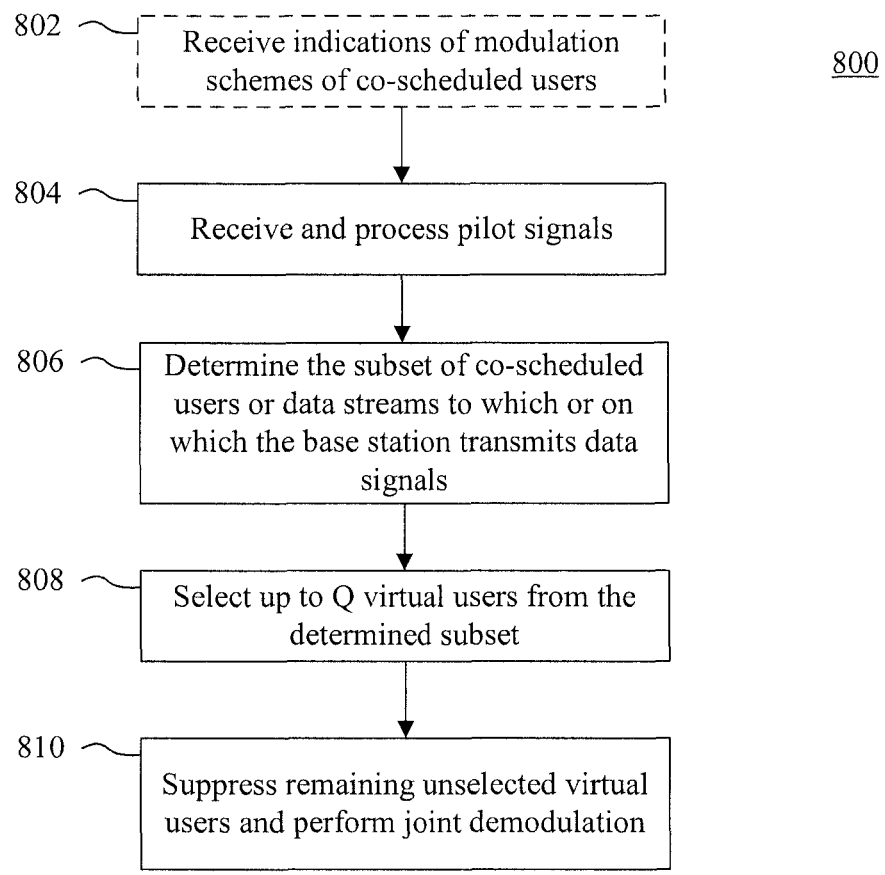
FIG. 8 is a high-level block/flow diagram of an embodiment of a selective joint demodulation method.

With reference now to FIG. 8, with continuing reference to FIGS. 1 and 5-7, a method 800 for jointly demodulating data signals in accordance with an exemplary embodiment is illustrated. The method 800 can be performed by the user 102, which can interact with the base station 104 in the system 100 to implement the method. The method 800 can begin at optional step 802 in which the processor 510 can receive via the receiver 513 indications of modulation schemes of co-scheduled users. For example, the processor 510 can receive the indications in accordance with methods 600 and 700 described in detail above.

At step 804 the receiver 513 of the user 102 can receive and process pilot signals. For example, as discussed above, each user can be aware of the dimensions of its own precoded pilots sent by the base station. The user can be informed of such dimensions via a separate signal, using for example a unique identifier for the user. Further, each user can be pre-configured to know on which particular resource blocks all such pilot signals can be sent.

At step 806, the processor 510 of the user 102 can determine the subset of co-scheduled users ũ or data streams to which or on which the base station transmits data signals, as described above. For example, as indicated above, the processor 510 can compare an energy or a norm of each of the pilots signals to a threshold to determine which of the expected co-scheduled users are missing. It should be noted that the discussion above concerning present and missing "users" can apply to the $r_k$ data streams corresponding to each user. For example, as opposed to considering and determining which ũ users are present, the user 102 can determine, of the $$S = \sum_{k \in \mathcal{U}} r_k$$

streams associated with the expected co-scheduled users υ, which data streams directed to the ũ users are present. Similarly, the user 102 can determine, which of the $$S = \sum_{k \in \mathcal{U}} r_k$$

streams directed to the "missing" users are missing. Further, the determination of which of the users or data streams are missing or present can be based on comparing the energy or norm of each of the pilot signals associated with users in set υ to a threshold, as described above, such that the data streams directed to the users associated with pilot signals having energies or norms below the threshold are deemed missing by the processor 510.

At step 808, the processor 510 can select a group of the co-scheduled users or of the transmitted co-scheduled data streams from the subset determined at step 806. For example, the processor 510 can employ the incomplete-modulation-selection rule described above to select up to Q other virtual users, or their corresponding data streams. Indeed, the processor 510 can determine the group of data streams by simply selecting the data streams associated with the users in D, which can be determined as described in more detail herein below. It should be noted that if the modulation type of a virtual user in D, or of corresponding data streams directed to the virtual user in D, is unknown, due to, for example, non-receipt of an indication of the modulation type at step 802, the processor 510 at step 808 can use any suitable modulation classification algorithm on the model in (4) to make a decision on its modulation (which in practical systems can be either 4-QAM, 16-QAM or 64-QAM). This classification algorithm can also exploit the fact that the modulation of the data stream(s) of each such virtual user will remain constant within a resource block, where a resource block is the minimum time-frequency unit that can be assigned to a scheduled user. After modulations have been decided for all such virtual users in D, the processor 510 can use a suitable joint demodulation algorithm, as discussed in more detail herein below. Alternatively, instead of deciding the modulation of a user, or its corresponding data stream(s), to be one of either 4-QAM, 16-QAM or 64-QAM, the processor 510 can assume that the symbols of this user are drawn from a super-constellation which includes all (normalized) 4-QAM, 16-QAM and 64-QAM symbols. In particular, a symbol is chosen from this super-constellation by first selecting one of 4-QAM 16-QAM and 64-QAM with probabilities $p_1$, $p_2$ and $p_3$, respectively, where $p_1, p_2, p_3 \in [0,1]$ such that $p_1+p_2+p_3=1$. A symbol from the selected constellation is then drawn equi-probably, so that if 4-QAM constellation was selected then a symbol from it is picked with probability 1/4, and so on. The processor 510 can tune the variables $p_1$, $p_2$, and $p_3$ to improve performance and a default choice is $p_1=p_2=p_3=1/3$.

With regard to the incomplete-modulation-selection rule that the processor 510 can apply at step 808, it should be noted that to determine a suitable D, or data streams corresponding to the co-scheduled users in D, the rule can employ a metric that yields a value for each valid choice of D, or for each choice of the data streams associated with the users in D. The application of the selection rule by the processor 510 can then maximize this metric over all valid choices of D, or over all valid choices of the data streams associated with the users in D. One such metric is the mutual information $I(\tilde{z};s_1)$ that is computed for a given choice of D, or for a given choice of the data streams associated with the users in D. In particular, $I(\tilde{z};s_1)$ is computed by assuming M in (4) to be a given fixed matrix and $s_1$, $s_D$, $\hat{\eta}$ to be mutually independent random vectors, wherein the elements of $s_1$, $s_D$ are all mutually independent and uniformly distributed over their respective QAM constellations (in case the modulation is unknown for a virtual user, it can be assumed to be a super-constellation and the corresponding probability mass function can be assumed to be the one induced by $p_1$, $p_2$, $p_3$) and those of $\hat{\eta}$ are i.i.d. zero-mean complex Gaussian.

Because evaluating this metric can be computationally involved, another metric can be employed. It should be noted that for any choice of D, there is a multiple access channel (MAC) model in (4) in which the users are user-1 together with the virtual users in D. Here, the optimal joint decoder can be considered for all users, or their corresponding data streams, in this MAC. Then, a metric for the possibility of a codeword error occurring for user-1 is the following $$h(\mathcal{D}) = \min_{\mathcal{A}: \mathcal{A} \subseteq \mathcal{D}} \left\{ \log \left| I + \Gamma_1 F B_1 B_1^\dagger F^\dagger + \sum_{k \in \mathcal{A}} \Gamma_k F c_k c_k^\dagger F^\dagger \right| - R_1 - \sum_{k \in \mathcal{A}} R_k \right\} \quad (5)$$

It should be further noted that h(D) can be efficiently computed using sub-modular function minimization techniques. A suitable subset D of virtual users, or their corresponding data streams, can be selected as the one that maximizes the metric over all subsets of virtual users, or their corresponding data streams. The subset D of virtual users should be those whose cardinalities are no greater than Q. In addition, the processor 510 can also use parameters $a_1$ and $\{\Gamma_k\}$ and $\{R_k\}$ to tune the selection rule. In case $r_1=1$ (so that $B_1=b_1$ is a vector) and Q=1, the selection rule given above can be further simplified. Define the matrix $T=(I+\Gamma[b_1, C]^\dagger[b_1, C]\Gamma)^{-1}$, where $$\Gamma = \text{diag}\{\sqrt{\Gamma_1}, \{\sqrt{\Gamma_k}\}_{k \neq 1}\}, \text{ where } \{\sqrt{\Gamma_k}\}_{k \neq 1}$$

corresponds to all the W virtual users. The processor 510 can obtain the determinant of all 2×2 principal sub-matrices of T such as $$a_i = |[T(1,1), T(1,i); T(i,1), T(i,i)]|, i \geq 2 \quad (6)$$

and can determine $b_i=1/a_i$, $i \geq 2$. Further, the processor 510 can select the virtual user $\hat{i}$, or its corresponding data streams, that maximizes $\log(b_i)-R_i$, $i \geq 2$. In addition, the processor 510 can set $D=\{\hat{i}\}$ if $\log(b_{\hat{i}})-R_{\hat{i}} \geq R_1$, else it can set D to be the empty set $\phi$.

Another feature that can be incorporated in the selection rule is one where selecting a smaller number of virtual users for joint demodulation is incentivized subject to certain minimum performance criterion such as an acceptable error or outage probability. In particular, given a maximum number Q of virtual users that can be selected out of those deemed present, the selection rule can check if a minimum performance criterion is satisfied for $D=\phi$. If not, the rule can examine all subsets with $|D|=1$ and continue so on. The best subset of virtual users for joint demodulation is thus selected among all subsets of a size m, $1 \leq m \leq Q$, where m is the smallest size for which a subset is present that can meet the minimum performance criterion. If the minimum performance criterion cannot be satisfied, then the processor 510 can select the best subset of size Q or can fall back to $D=\phi$.

At step 810, the receiver 513 can receive data signals from the base station and the processor 510 can jointly demodulate the data signals by employing the selected group of co-scheduled users or data streams and suppressing non-selected data streams from the subset determined at step 806, as described above. For example, the processor 510 can receive and suppress the non-selected data streams, or the data streams associated with the non-selected co-scheduled users, as described in (4) and can jointly demodulate data signals on data streams associated with the group selected at step 808.

Having described preferred embodiments of systems, methods and apparatuses for signaling and receiving mixture combination sets (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining modulation information of co-scheduled users, the method comprising:
   receiving an index;
   referencing a table of indices in which the received index denotes a plurality of different sets of modulation schemes, a total number of co-scheduled streams, and denotes one or more stream indices for a given user to which the received index is directed;
   determining at least one modulation scheme of at least one co-scheduled user based on the referencing; and
   receiving data signals and processing the data signals by utilizing the at least one modulation scheme.

2. The method of claim 1, wherein the determining further comprises selecting a set of modulation schemes from the plurality of different sets based on the one or more stream indices denoted by the received index in the table and based on a known modulation scheme for the user to which the received index is directed.

3. The method of claim 2, wherein each set of the plurality of different sets of modulation schemes conveys a corresponding stream index for each of the modulation schemes in the respective set.

4. The method of claim 2, further comprising:
receiving a separate signal denoting the known modulation scheme.

5. The method of claim 2, wherein the known modulation scheme is denoted by the received index.

6. The method of claim 1, further comprising:
referencing a listing of sets of modulation schemes including the plurality of different sets of modulation schemes to determine the at least one modulation scheme of the at least one co-scheduled user, wherein the sets of modulation schemes in the listing are structured in accordance with splits and wherein a split is a sequence of total numbers of streams respectively allocated to any given co-scheduled users that is arranged in decreasing order.

7. The method of claim 6, wherein each set in the listing is ordered in accordance with the stream indices and wherein each set in the listing is permutable such that stream indices of modulations assigned to co-scheduled users having a common total number of allocated streams are swappable without affecting a total number of indices of the table of indices and without affecting a total number of modulation scheme combinations that are conveyable by the table.

8. A system for conveying modulation information of co-scheduled users, the system comprising:
a scheduler configured to determine a set of co-scheduled users, a respective total number of streams for each of the users, and a respective modulation scheme for each of the users;
a controller configured to reference a listing of sets of modulation schemes to determine a set of modulation schemes that conforms to the determined total numbers of streams for each of the users and conforms to the determined modulation schemes for each of the users and configured to reference a table of indices in which each index of a plurality of the indices denotes a respective plurality of different sets of modulation schemes in the listing to select indices from the table for transmission to the co-scheduled users that denote the determined set of modulation schemes, a total number of co-scheduled streams, and denotes one or more stream indices for a given user for which the given index is selected; and
a transmitter configured to transmit a different one of the selected indices to each of the respective users to permit each of the users to determine the modulation schemes assigned to at least one other co-scheduled user.

9. The system of claim 8, wherein each given set in the respective plurality of different sets of modulation schemes indicates a corresponding stream index for each of the modulation schemes in the given set.

10. The system of claim 9, wherein the sets of modulation schemes in the listing are structured in accordance with splits and wherein a split is a sequence of total numbers of streams respectively allocated to any given co-scheduled users that is arranged in decreasing order.

11. The system of claim 10, wherein each set in the listing is ordered in accordance with the stream indices and wherein each set in the listing is permutable such that stream indices of modulations assigned to co-scheduled users having a common total number of allocated streams are swappable without affecting a total number of indices of the table of indices and without affecting a total number of modulation scheme combinations that are conveyable by the table.

12. A non-transitory computer readable storage medium comprising a computer readable program, wherein the computer readable program when executed on a computer causes the computer to perform a method for designing a signaling table to convey modulation information of co-scheduled users, the method comprising:
determining possible combinations of modulation schemes for a total number of users based upon splits, wherein a split is a sequence of total numbers of streams respectively allocated to co-scheduled users that is arranged in decreasing order; and
allocating indices to the determined combinations to generate the signaling table for use in conveying to a given user modulation schemes employed by users that are co-scheduled with the given user.

13. The non-transitory computer readable storage medium of claim 12, wherein the determining further comprises determining combinations of modulation schemes for each split in a successive order of splits such that a given split having a number of modulation schemes that is larger than a number of modulation schemes of an other split that succeeds the other split.

14. The non-transitory computer readable storage medium of claim 12, wherein the allocating further comprises allocating the indices for each split in a preceding order of splits such that a given split having a number of modulation schemes that is less than a number of modulation schemes of an other split that precedes the other split.

15. The non-transitory computer readable storage medium of claim 12, wherein the method further comprises:
arranging the determined combinations of modulation schemes in a listing such that the difference, in each column of the listing, between the numbers of instances of each modulation type is minimized.

16. The non-transitory computer readable storage medium of claim 12, wherein the generated signaling table includes at least one index that denotes a plurality of different combinations of modulation schemes.

17. The non-transitory computer readable storage medium of claim 16, wherein a particular combination in the plurality of different combinations denoted by the at least one index is conveyable to a particular user by means of a known modulation scheme assigned to the particular user that is in the particular combination.

18. The non-transitory computer readable storage medium of claim 12, wherein each of the determined combinations is ordered in accordance with stream indices and wherein each set in the listing is permutable such that stream indices of modulations assigned to co-scheduled users having a common total number of allocated streams are swappable without affecting a total number of indices of the signaling table and without affecting a total number of modulation scheme combinations conveyable by the table.

* * * * *